(12) United States Patent
Kasatani

(10) Patent No.: US 11,250,253 B2
(45) Date of Patent: Feb. 15, 2022

(54) HANDWRITING INPUT DISPLAY APPARATUS, HANDWRITING INPUT DISPLAY METHOD AND RECORDING MEDIUM STORING PROGRAM

(71) Applicant: Kiyoshi Kasatani, Kanagawa (JP)

(72) Inventor: Kiyoshi Kasatani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/973,051

(22) PCT Filed: Jun. 12, 2019

(86) PCT No.: PCT/IB2019/054891
§ 371 (c)(1),
(2) Date: Dec. 8, 2020

(87) PCT Pub. No.: WO2019/243954
PCT Pub. Date: Dec. 26, 2019

(65) Prior Publication Data
US 2021/0303836 A1    Sep. 30, 2021

(30) Foreign Application Priority Data

Jun. 19, 2018 (JP) .............................. JP2018-116499
May 17, 2019 (JP) .............................. JP2019-093665

(51) Int. Cl.
*G06F 17/00* (2019.01)
*G06K 9/00* (2022.01)
(Continued)

(52) U.S. Cl.
CPC ....... *G06K 9/00436* (2013.01); *G06F 3/0482* (2013.01); *G06F 3/04883* (2013.01); *G06F 40/109* (2020.01); *G06F 40/171* (2020.01)

(58) Field of Classification Search
CPC ............ G06K 9/00436; G06F 3/04883; G06F 3/0482; G06F 40/109; G06F 40/171
See application file for complete search history.

(56) References Cited

U.S. PATENT DOCUMENTS 5,812,697 A    9/1998  Sakai et al.
2004/0021700 A1*  2/2004  Iwema ................... G06K 9/033
                                                    715/863

(Continued)

FOREIGN PATENT DOCUMENTS

CN    102156577 A    8/2011
CN    102164074 A    9/2011

(Continued)

OTHER PUBLICATIONS

Shilman et al., Discerning Structure from Freeform Handwritten Notes, IEEE, 2003. p. 1-6 (Year: 2003).*

(Continued)

*Primary Examiner* — Andrew T McIntosh
(74) *Attorney, Agent, or Firm* — Xsensus LLP

(57) ABSTRACT

A handwriting input display apparatus causes display means to display a stroke generated by an input made by using input means to a screen as a handwritten object. The apparatus includes display control means for causing the display means to display character string candidates including a handwriting recognition candidate when the handwritten object does not change for a predetermined time. When the handwriting recognition candidate is selected, the display control means causes the display means to erase a display of the character string candidates and a display of the handwritten object, and causes the display means to display a character string object at a position where the erased handwritten object was displayed. When selection of the handwriting recognition candidate is not performed for a predetermined time and the display of the character string (Continued)

candidates is erased, the display control means causes the handwritten object to be kept displayed.

18 Claims, 35 Drawing Sheets

(51) Int. Cl.
    *G06F 40/109*     (2020.01)
    *G06F 40/171*     (2020.01)
    *G06F 3/0482*     (2013.01)
    *G06F 3/0488*     (2022.01)

(56) References Cited

U.S. PATENT DOCUMENTS

| | | | |
|---|---|---|---|
| 2011/0314021 A1* | 12/2011 | Gibbs | G06F 16/3322 707/737 |
| 2015/0135065 A1 | 5/2015 | Hirabayashi et al. | |
| 2015/0242114 A1 | 8/2015 | Hirabayashi et al. | |
| 2017/0270357 A1* | 9/2017 | Winebrand | G06K 9/00436 |

FOREIGN PATENT DOCUMENTS

| | | |
|---|---|---|
| JP | 2002-007962 | 1/2002 |
| JP | 2003-271899 | 9/2003 |
| JP | 2007-018290 | 1/2007 |
| JP | 2007-265171 | 10/2007 |
| JP | 2016-015099 | 1/2016 |
| JP | 2018-049502 | 3/2018 |

OTHER PUBLICATIONS

Ye et al., Learning to Group Text Lines and Regions in Freeform Handwritten Notes, IEEE, 2007, 1-5 (Year: 2007).*
International Search Report dated Nov. 5, 2019 in PCT/IB2019/054891 filed on Jun. 12, 2019.
Chapter II report dated May 20, 2020 in PCT/IB2019/054891 filed on Jun. 12, 2019.
Giovanni Seni, et al., "External word segmentation of off-line handwritten text lines", Pattern Recognition, vol. 27, No. 1, pp. 41-52, Jan. 1994.
CS&E—Upload peer contribution by CNIPA dated Oct. 9, 2019, in PCT/IB2019/054891 filed on Jun. 12, 2019.
CS&E—Upload peer contribution by EPO dated Oct. 10, 2019, in PCT/IB2019/054891 filed on Jun. 12, 2019.
CS&E—Upload pear contribution by KIPO dated Oct. 15, 2019, in PCT/IB2019/054891 filed on Jun. 12, 2019.
CS&E—Upload peer contribution by USPTO dated Sep. 30, 2019, in PCT/IB2019/054891 filed on Jun. 12, 2019.

* cited by examiner

FIG. 1
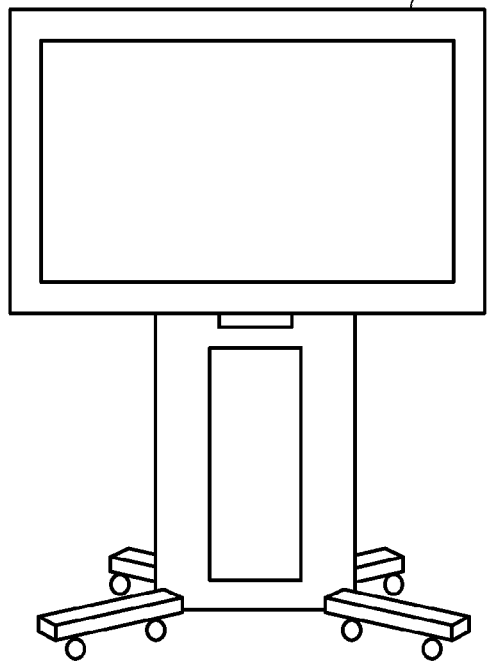
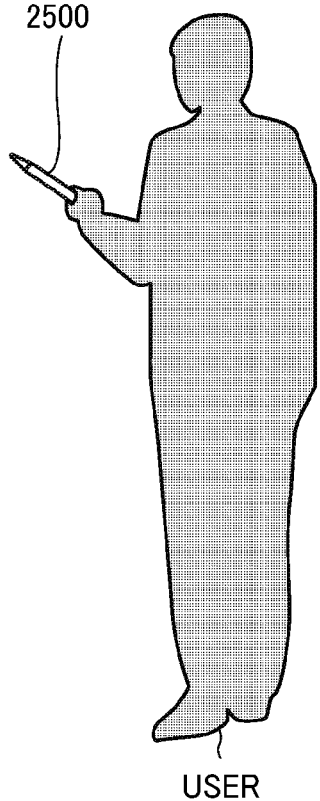

FIG. 12

| | PREDEFINED ITEM | PREDEFINED CONTENT |
|---|---|---|
| 401 | CHARACTER STRING CANDIDATE DISPLAY TIMER | TimerValue = "500ms" |
| 402 | CHARACTER STRING CANDIDATE DELETION TIMER | TimerValue = "5000ms" |
| 403 | HANDWRITTEN OBJECT VICINITY RECTANGULAR AREA | Horizontal = "50%" Vertical = "80%" |
| 404 | DETERMINATION CONDITIONS FOR PREDICTED WRITING DIRECTION AND CHARACTER SIZE | MinDiff = "10mm" MinTime = "1000ms" DefDir = "Horizontal" |
| 405a | RELATIVELY SMALL-SIZED CHARACTER | FontStyle = "Mincho" FontSize = "25mm" |
| 405b | RELATIVELY MEDIUM-SIZED CHARACTER | FontStyle = "Mincho" FontSize = "50mm" |
| 405c | RELATIVELY LARGE-SIZED CHARACTER | FontStyle = "Gothic" FontSize = "100mm" |

EXAMPLE OF HANDWRITING
RECOGNITION DICTIONARY
DATA 601

| | PRE-CON-VERSION | POST-CON-VERSION | PROBA-BILITY |
|---|---|---|---|
| 604 { | ぎ | 議 | 0.55 |
| | ぎ | 技 | 0.45 |
| 605 { | ぎし | 技士 | 0.55 |
| | ぎし | 技師 | 0.45 |
| 606 { | ぎじ | 疑似 | 0.30 |
| | ぎじ | 議事 | 0.25 |
| | ぎじ | 擬似 | 0.20 |
| | ぎじ | ギジ | 0.15 |

FIG. 14B

EXAMPLE OF CHARACTER STRING CONVERSION DICTIONARY DATA 602

| | PRE-CON-VERSION | POST-CON-VERSION | PROBA-BILITY |
|---|---|---|---|
| 607 | 議 | 議事録 | 0.95 |
| 607 | 技 | 技量試 | 0.85 |
| 608 | 技士 | 技士会 | 0.65 |
| 608 | 技師 | 技師長 | 0.75 |
| 609 | ぎじ | 議事録 | 0.95 |
| 609 | ぎじ | 技術士 | 0.85 |
| 609 | ぎじ | 技術 | 0.75 |
| 610 | 擬似 | 擬似相関 | 0.55 |
| 610 | 擬似 | 擬似的 | 0.50 |
| 610 | 擬似 | 擬似乱数 | 0.40 |

FIG. 14C

EXAMPLE OF PREDICTIVE CONVERSION DICTIONARY DATA 603

| | PRE-CON-VERSION | POST-CONVERSION | PROBA-BILITY |
|---|---|---|---|
| 611 { | 議事録 | 議事録の送付先 | 0.65 |
| | 技量試 | 技量試を決裁 | 0.75 |
| 612 { | 技士 | 技士会連合会 | 0.95 |
| | 技師 | 技師エンジニア | 0.85 |
| 613 | 技術 | 技術評論社 | 0.65 |
| 614 { | 擬似 | 擬似サーヴァント | 0.45 |
| | 擬似 | 擬似逆行列 | 0.35 |

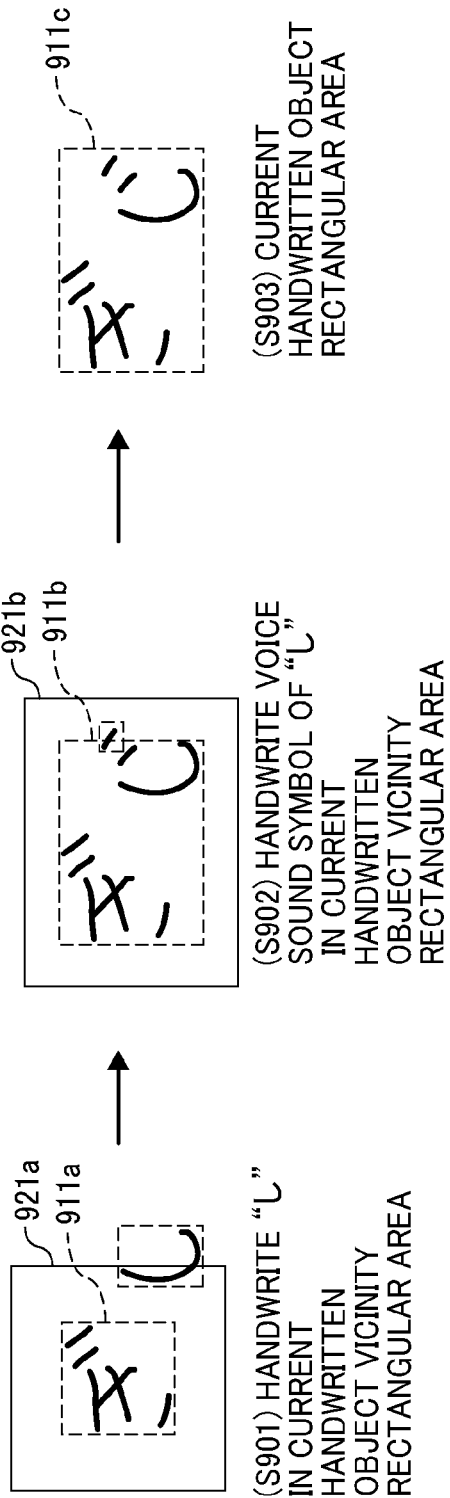

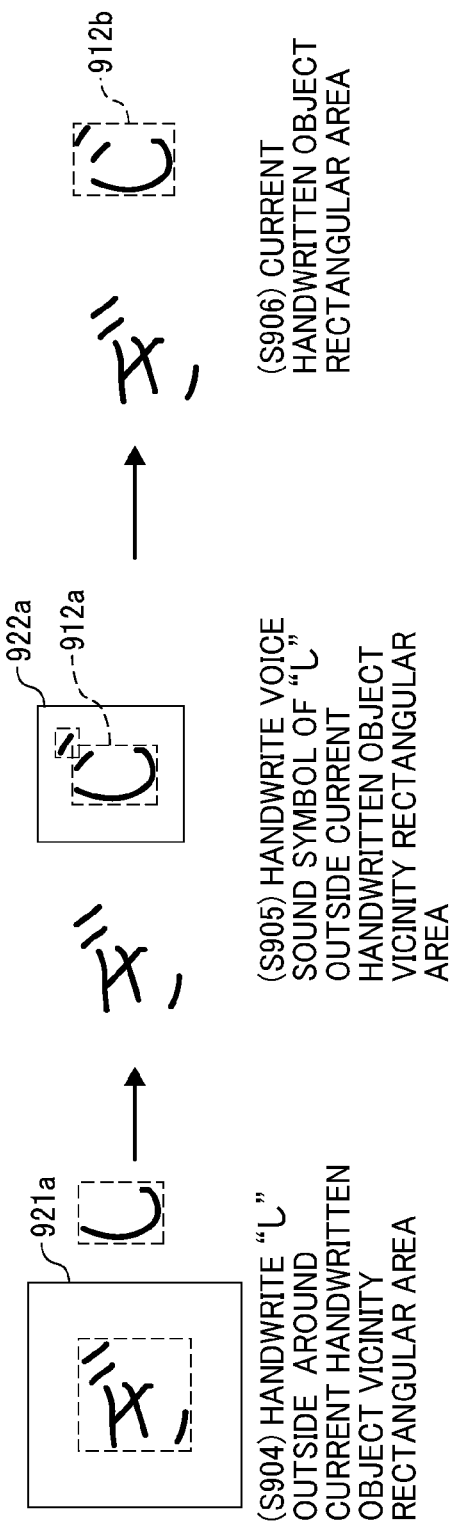

(S1003) HANDWRITE RELATIVELY LARGE-SIZED "ぎじ" HORIZONTALLY → SELECT "技術" FROM CANDIDATES (S1101)
HANDWRITE RELATIVELY
SMALL-SIZED "ぎじ"
VERTICALLY →
 SELECT "技術"
FROM CANDIDATES (S1102)
HANDWRITE RELATIVELY
MEDIUM-SIZED "ぎじ"
VERTICALLY →
SELECT "技術" FROM
CANDIDATES (S1201) HANDWRITE HORIZONTALLY IN AREA OTHER THAN UPPER PART OF SCREEN (S1202) HANDWRITE HORIZONTALLY
IN OR NEAR UPPER PART OF SCREEN (S1203) HANDWRITE VERTICALLY IN AREA OTHER THAN RIGHT PART OF SCREEN (S1204) HANDWRITE VERTICALLY
IN OR NEAR RIGHT PART OF SCREEN

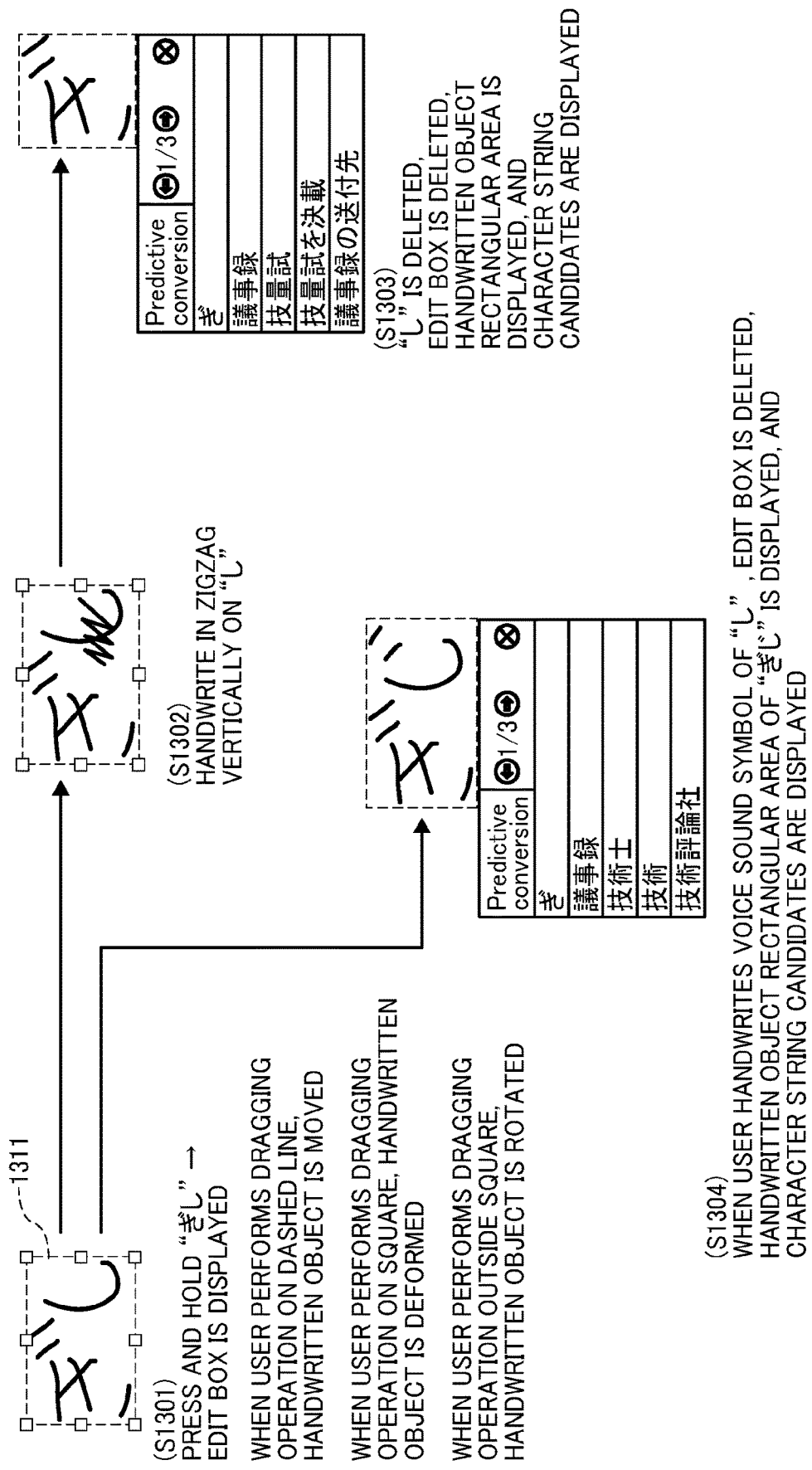

HANDWRITING INPUT SCREEN OF TABLET PC INPUT PANEL

SELECT HANDWRITING AND
CONVERT TO CHARACTER STRING

HANDWRITING INPUT DISPLAY APPARATUS, HANDWRITING INPUT DISPLAY METHOD AND RECORDING MEDIUM STORING PROGRAM

CROSS-REFERENCE TO RELATED APPLICATIONS

The present application is based on PCT filing PCT/IB2019/054891, filed Jun. 12, 2019, which claims priority to JP 2018-116499, filed Jun. 19, 2018, and JP 2019-093665, filed May 17, 2019, the entire contents of each are incorporated herein by reference.

TECHNICAL FIELD

The present disclosure relates to a handwriting input display apparatus, a handwriting input display method, and a recording medium storing a program.

BACKGROUND ART

In a touch panel operation type computer (hereinafter referred to as a "tablet computer (PC)") that does not include a keyboard, input software dedicated to a tablet PC such as a handwriting input screen example is prepared as illustrated in FIG. 22A. The input software enables a user of the tablet PC to select one of a software keyboard input and a handwriting input to input a character string at the current cursor position. In addition, as illustrated in FIG. 22B, when a user draws characters in a frame by hand using an electronic pen attached to the tablet PC, the handwritten character string is recognized as a character string. When "INSERT" button is pressed, the recognized character string is input at the current cursor position.

Patent Literature (PTL) 1 describes an apparatus in which characters drawn by hand in a frame and a recognized character are displayed concurrently, and the recognized character string is finally input in a specified region. The apparatus of PTL 1 includes an input frame for recognizing the handwritten characters as a character string, in substantially the same manner as the tablet PC.

PTL 2 discloses a character recognition technique that does not use a frame. PTL 2 is silent on how to deal with a recognized character string.

CITATION LIST

Patent Literature

[PTL 1]
Japanese Unexamined Patent Application Publication No. 2002-007962
[PTL 2]
Japanese Unexamined Patent Application Publication No. 2003-271899

SUMMARY OF INVENTION

Technical Problem

In the above-described background art, a handwritten object in the input frame is recognized as a character, and the recognized character is input at the current cursor position. Further, in the above-described background art, the handwriting area is selected later to convert the handwriting to characters, and the handwriting in the input frame is converted to characters by selecting a clear copy mode. However, in any of the above cases, a special procedure for inputting a character string is to be performed. When a desired character string is not recognized, a more complicated procedure is to be performed for recognition of the desired character string. Alternatively, a user gives up the recognition of the character string and switches to the handwriting input mode to input handwritten characters as they are. Although the recognition rate of handwritten characters by computers has been improving, there still often occurs a case in which characters handwritten by a user that are difficult to read are not recognized. Accordingly, the above-mentioned complicated procedures and mode switching may occur frequently. When the purpose is clean writing, it does not matter if time is spent on such complicated procedures and mode switching. However, when the purpose is communication, such as when a plurality of users make discussions gathering around a handwriting input board, the users have little time for such complicated procedures or mode switching.

An object of the present disclosure is to provide an apparatus and a method that automatically displays recommendable handwriting recognition candidates without reducing the speed of handwriting input, allows a user to select a character string from the handwriting recognition candidates as needed, converts into the selected character string, and if not necessary, allows the user to ignore the handwriting recognition candidates and continue the handwriting input.

Solution to Problem

Example embodiments of the present disclosure include a handwriting input display apparatus that causes display means to display a stroke generated by an input made by using input means to a screen of the display means as a handwritten object. The handwriting input display apparatus includes display control means for causing the display means to display character string candidates including a handwriting recognition candidate, which is a result of recognizing the handwritten object as a character string, when the handwritten object does not change for a predetermined time period. When the handwriting recognition candidate is selected, the display control means causes the display means to erase a display of the character string candidates and a display of the handwritten object, and causes the display means to display a character string object, which is a character string indicated by the selected handwriting recognition candidate, at a position where the erased handwritten object was displayed. When selection of the handwriting recognition candidate is not performed for a predetermined time period and the display of the character string candidates is erased, the display control means causes the handwritten object to be kept displayed to allow a user to continue handwriting input.

Advantageous Effects of Invention

According to one or more embodiments of the present disclosure, a method is provided that automatically displays recommendable handwriting recognition candidates without reducing the speed of handwriting input, allows a user to select a character string from the handwriting recognition candidates as needed, converts to the selected character string, and if not necessary, allows the user to ignore the handwriting recognition candidates and continue the handwriting input.

BRIEF DESCRIPTION OF DRAWINGS

The accompanying drawings are intended to depict example embodiments of the present disclosure and should not be interpreted to limit the scope thereof. The accompanying drawings are not to be considered as drawn to scale unless explicitly noted. Also, identical or similar reference numerals designate identical or similar components throughout the several views.

FIG. 1 is a diagram illustrating an example of an overview of a configuration of a handwriting input apparatus, according to an embodiment of the present disclosure.

FIG. 12 is a diagram illustrating an example of predefined control data, according to an embodiment of the present disclosure.

FIG. 14A, FIG. 14B and FIG. 14C are diagrams, each illustrating an example of dictionary data, according to an embodiment of the present disclosure.

FIG. 17A and FIG. 17B are illustrations for describing an example of how a handwritten object is newly generated, according to an embodiment of the present disclosure.

FIG. 21 is a diagram illustrating an example of an editing operation of a handwritten object, according to an embodiment of the present disclosure.

DESCRIPTION OF EMBODIMENTS

Figure 2A:
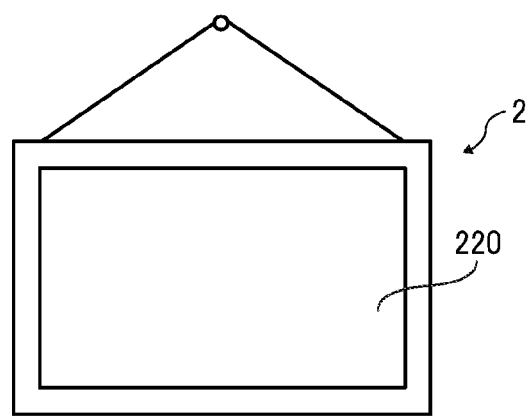
FIG. 2A, FIG. 2B, and FIG. 2C are diagrams, each illustrating another example of an overview of a configuration of the handwriting input apparatus, according to an embodiment of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure are described.

<Overview of Configuration of Apparatus>

First, a description is given of an overview of a configuration of a handwriting input apparatus 2 according to an embodiment of the present disclosure, with reference to FIG. 1 and FIG. 2A to FIG. 2C. FIG. 1 is a diagram illustrating an example of an overview of a configuration of the handwriting input apparatus 2. In the present embodiment, an electronic whiteboard is illustrated as an example of the handwriting input apparatus 2.

As illustrated in FIG. 1, a display 220 as an example of a display device is provided in the upper part of the handwriting input apparatus 2. A user can input (draw) characters or the like on the display 220 using the electronic pen 2500.

Figure 2B:
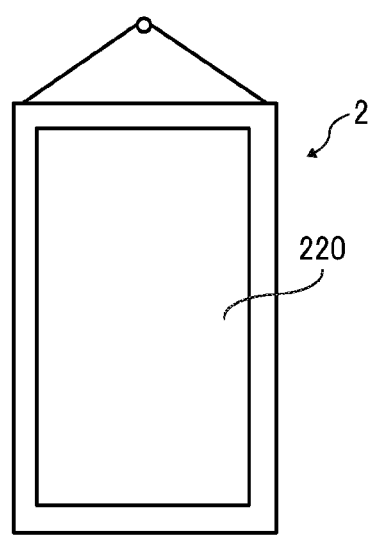
Figure 2C:
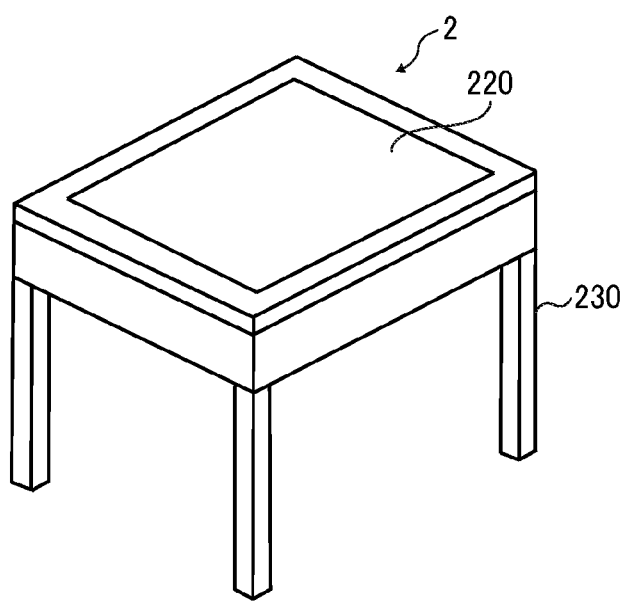

FIG. 2A, FIG. 2B, and FIG. 2C are diagrams, each illustrating another example of an overview of a configuration of the handwriting input apparatus 2. FIG. 2A illustrates, as an example of the handwriting input apparatus 2, the handwriting input apparatus 2 used as an electronic whiteboard having a landscape rectangular shape and being hung on a wall. FIG. 2B illustrates the handwriting input apparatus 2 used as an electronic whiteboard having a portrait rectangular shape and being hung on a wall. FIG. 2C illustrates the handwriting input apparatus 2 placed on the top of a desk 230. Since the handwriting input apparatus 2 has a thickness of about 1 centimeter, one does not have to adjust the height of the desk 230 when the handwriting input apparatus 2 is placed on the top of the desk 230, which is a general-purpose desk. In addition, one can move the handwriting input apparatus 2 without difficulty.

<Example of Appearance of Electronic Pen 2500>

Figure 3:
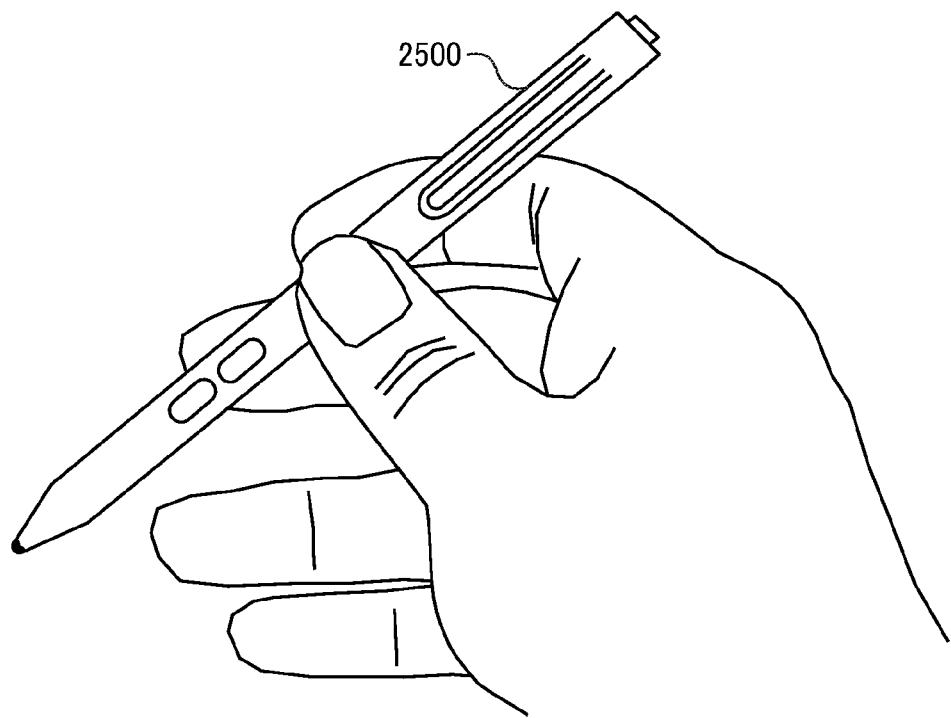
FIG. 3 is an example of a perspective view of an electronic pen, according to an embodiment of the present disclosure.

FIG. 3 is an example of a perspective view of an electronic pen 2500. The electronic pen 2500 illustrated in FIG. 3 is an example of a multifunctional electronic pen. The electronic pen 2500 including a built-in power supply and being configured to transmit an instruction to the handwriting input apparatus 2 is called an "active pen". By contrast, the electronic pen that does not include a built-in power supply is called a "passive pen". The electronic pen 2500 illustrated in FIG. 3 includes one physical switch provided at the pen tip, one physical switch provided at the pen end, and two physical switches on the pen side. The physical switch provided at the pen tip is used for writing (drawing) objects. The physical switch provided at the pen end is used for erasing written (drawn) objects. The physical switches provided on the pen side is used for implementing functions assigned by a user.

The electronic pen including the switches allows a user to reduce the operation procedure of the handwriting input apparatus 2. An electronic pen including a switch mainly refers to an active pen. However, since an electromagnetic induction passive pen not including a built-in power supply can generate power by an LC circuit, the electronic pen including the switch includes not only the active pen but the electromagnetic induction passive pen. In addition to the electromagnetic induction passive pen, an optical type electronic pen, an infrared type electronic pen, and an electrostatic capacity type electronic pen, each including a switch, is an active pen.

A user can assign a pen function menu to one of the switches on the pen side and an edit function menu to the other one of the switches on the pen side. The pen function menu allows the user to select the color, thickness and operating mode of the pen. The edit function menu allows the user to select one of erasing, selecting, cutting, copying, and pasting an object. When the user presses either one of the switches provided on the side of the electronic pen 2500 while holding the pen in his/her hand, the pen function menu or the edit function menu is displayed. Although this is convenient for the user, the complexity of operation is unchanged since the user has to press either one of the switches provided on the pen side to open the pen function menu or the edit function menu each time the user changes an object to be operated. On the other hand, when the user uses the switch for erasing provided at the pen end, the operation procedure required for erasing can be shortened to one step, since the user can erase an object by using the pen end instead of pen tip.

It is assumed that a hardware configuration of the electronic pen 2500 is the same as that of a general-purpose control system including a communication capability and a microcomputer. Examples of an input method of coordinates by the electronic pen 2500 include an electromagnetic induction method and an active electrostatic coupling method. In other example, the electronic pen 2500 further has functions such as pen pressure detection, inclination detection, a hover function (displaying a cursor before the pen is brought into contact), or the like.

<Hardware Configuration of Handwriting Input Apparatus 2>

Figure 4:
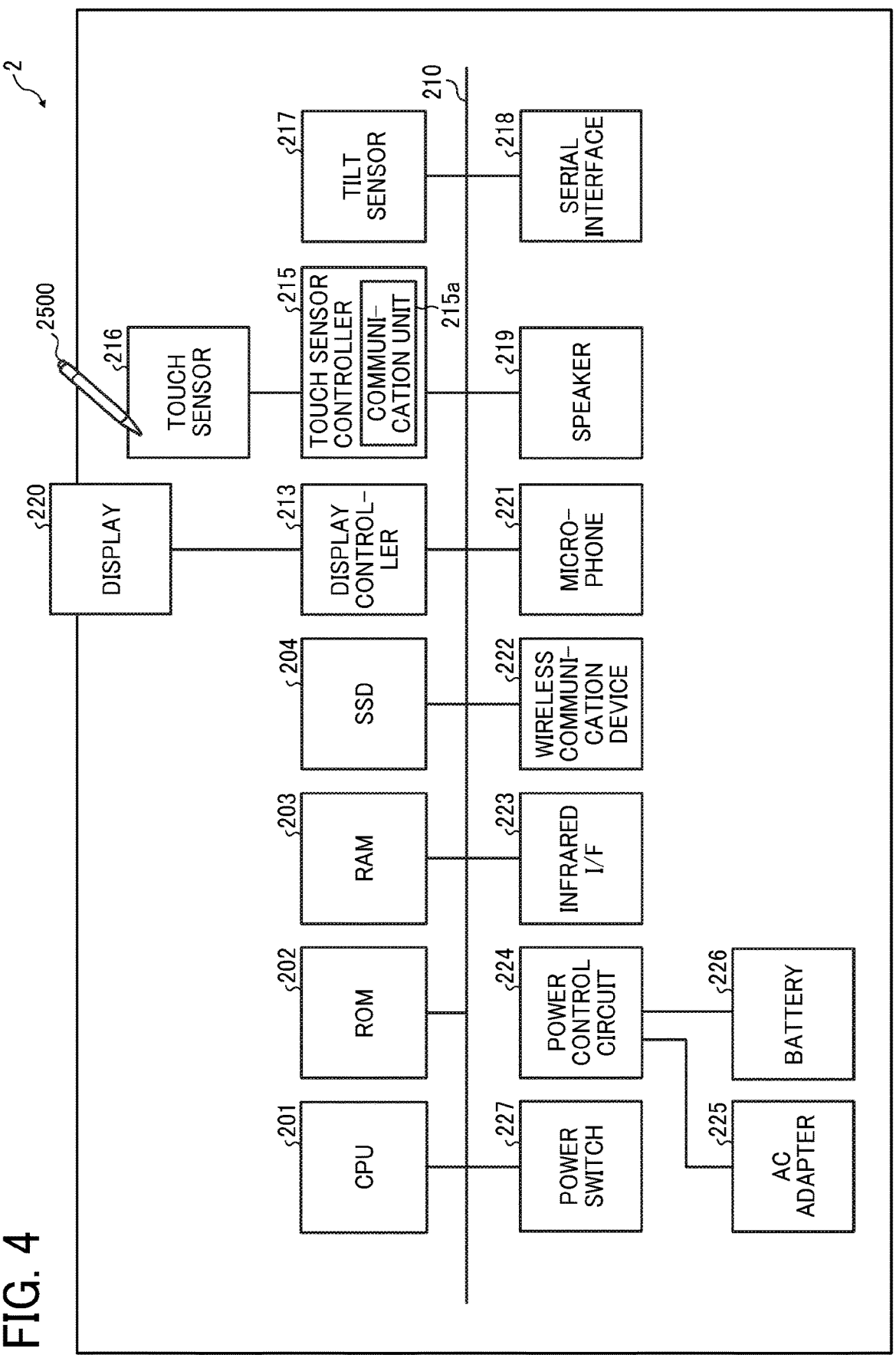
FIG. 4 is a block diagram illustrating an example of a hardware configuration of the handwriting input apparatus, according to an embodiment of the present disclosure.

A description is given now of a hardware configuration of the handwriting input apparatus 2, with reference to FIG. 4. The handwriting input apparatus 2 has a configuration of an information processing apparatus or a computer, as illustrated. FIG. 4 is a block diagram illustrating an example of a hardware configuration of the handwriting input apparatus 2. As illustrated in FIG. 4, the handwriting input apparatus 2 includes a central processing unit (CPU) 201, a read only memory (ROM) 202, a random access memory (RAM) 203, and a solid state drive (SSD) 204.

The CPU 201 controls entire operation of the handwriting input apparatus 2. The ROM 202 stores programs such as an Initial Program Loader (IPL) to boot the CPU 201. The RAM 203 is used as a work area for the CPU 201. The SSD 204 stores various data such as a control program for the handwriting input apparatus 2.

The handwriting input apparatus 2 further includes a display controller 213, a touch sensor controller 215, a touch sensor 216, a display 220, a power switch 227, a tilt sensor 217, a serial interface 218, a speaker 219, a microphone 221, a wireless communication device 222, an infrared interface (I/F) 223, a power control circuit 224, an AC adapter 225, and a battery 226.

The display controller 213 controls display of an image for output to the display 220, etc. The touch sensor 216 detects that the electronic pen 2500, a user's hand or the like is brought into contact with the display 220. The pen or the user's hand is an example of input means.

The touch sensor controller 215 controls processing of the touch sensor 216. The touch sensor 216 performs coordinate input and coordinate detection. More specifically, in a case where the touch sensor 216 is optical type, the display 220 is provided with two light receivers/emitters disposed on both upper side ends of the display 220, and a reflector frame surrounding the sides of the display 220. The light receivers/emitters emit a plurality of infrared rays in parallel to a surface of the display 220. Light receiving elements receive lights passing in the direction that is the same as an optical path of the emitted infrared rays, which are reflected by the reflector frame. The touch sensor 216 outputs position information of the infrared ray that is blocked by an object after being emitted from the two light receivers/emitters, to the touch sensor controller 215. Based on the position information of the infrared ray, the touch sensor controller 215 detects a specific coordinate that is touched by the object. In addition, the touch sensor controller 215 includes a communication unit 215a that allows the handwriting input apparatus 2 to communicate with the electronic pen 2500 wirelessly. For example, when communication is performed in compliance with a standard such as Bluetooth (registered trademark), a commercially available pen can be used. If one or more electronic pens 2500 are registered in the communication unit 215a in advance, the handwriting input apparatus 2 and the electronic pen 2500 communicates with each other without the user's manual operation of configuring connection settings between the electronic pen 2500 and the handwriting input apparatus 2.

The power switch 227 is a switch that turns on or off the power of the handwriting input apparatus 2. The tilt sensor 217 is a sensor that detects the tilt angle of the handwriting input apparatus 2. The tilt sensor 217 is mainly used to detect whether the handwriting input apparatus 2 is being used in any of the installation states of FIG. 2A, FIG. 2B or FIG. 2C. The thickness of characters or the like can be changed automatically based on the detected installation state.

The serial interface 218 is an interface to connect the handwriting input apparatus 2 to extraneous sources such as a universal serial bus (USB). The serial interface 218 is used to input information from extraneous sources. The speaker 219 is used for outputting sounds. The microphone 221 is used for inputting sounds. The wireless communication device 222 communicates with a terminal carried by a user and relays the connection to the Internet, for example. The wireless communication device 222 performs communication in compliance with Wi-Fi, Bluetooth (registered trademark) or the like. Any suitable standard can be applied other than the Wi-Fi and Bluetooth (registered trademark). The wireless communication device 222 forms an access point. When a user sets a service set identifier (SSID) and a password that the user obtains in advance in the terminal carried by the user, the terminal is connected to the access point.

It is preferable that two access points are provided for the wireless communication device 222 as follows:

(a) Access point->Internet;
(b) Access point->Intra-company network->Internet

The access point of (a) is for users other than corporate staffs. Through the access point of (a), such users cannot access the intra-company network, but can use the Internet. The access point of (b) is for corporate staffs as users, and such users can use the intra-company network and the Internet.

The infrared I/F 223 detects another handwriting input apparatus 2 provided adjacent to the own handwriting input apparatus 2. The infrared I/F 223 detects another handwriting input apparatus 2 provided adjacent to the own handwriting input apparatus 2 by using the straightness of infrared rays. It is preferable that one infrared I/F 223 is provided on each side of the display 220. This allows the handwriting input apparatus 2 to detect the direction in which another handwriting input apparatus 2 is provided. This extends the screen. Accordingly, handwritten information or the like that was previously written on the adjacent handwriting input apparatus 2 is displayed, for example. In other words, when it is assumed that an area of one display 220 defines one page, handwritten information on another page can be displayed.

The power control circuit 224 controls the AC adapter 225 and the battery 226, which are power supplies of the handwriting input apparatus 2. The AC adapter 225 converts alternating current shared by a commercial power supply into direct current.

In a case where the display 220 is a so-called electronic paper, little or no power is consumed to maintain display of the image. Accordingly, in such case, the handwriting input apparatus can be driven by the battery 226. This makes it possible to use the handwriting input apparatus 2 for applications such as digital signage even in places where it is difficult to connect the power supply, such as outdoors.

Furthermore, the handwriting input apparatus 2 includes a bus line 210. The bus line 210 is an address bus, a data bus or the like, which electrically connects the elements in FIG. 4 such as the CPU 201.

The touch sensor 216 is not limited to the optical type. In another example, the touch sensor 216 is a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. The touch sensor 216 can be of a type that does not require an electronic pen to detect whether the pen tip is in contact with the surface of the display 220. In this case, a fingertip or a pen-shaped stick is used for touch operation. In addition, the electronic pen 2500 can have any suitable shape other than a slim pen shape.

<Functional Configuration of Handwriting Input Apparatus 2>

Figure 5:
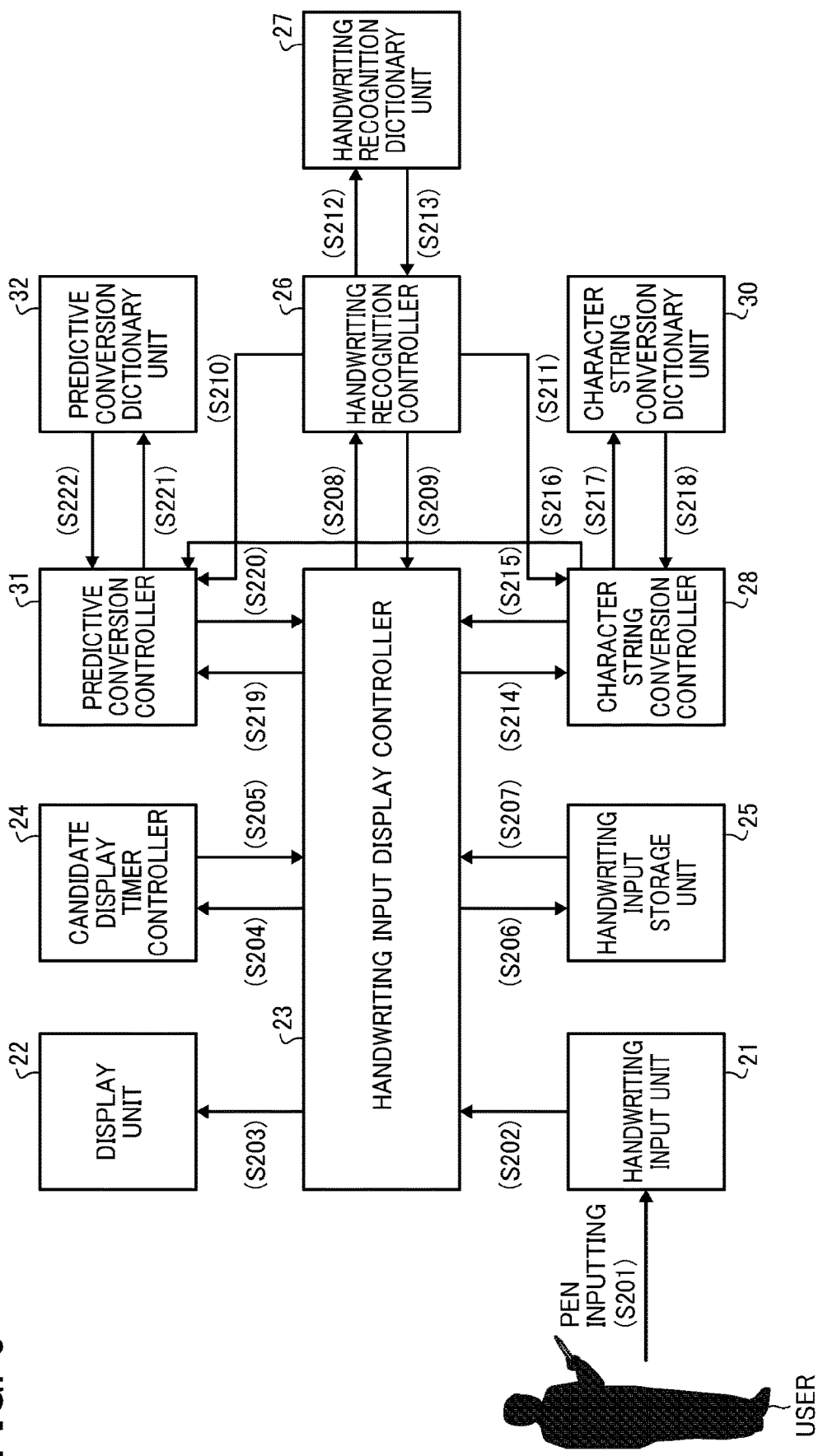
FIG. 5 is a block diagram illustrating an example of a functional configuration of the handwriting input apparatus, according to an embodiment of the present disclosure.
Figure 6:
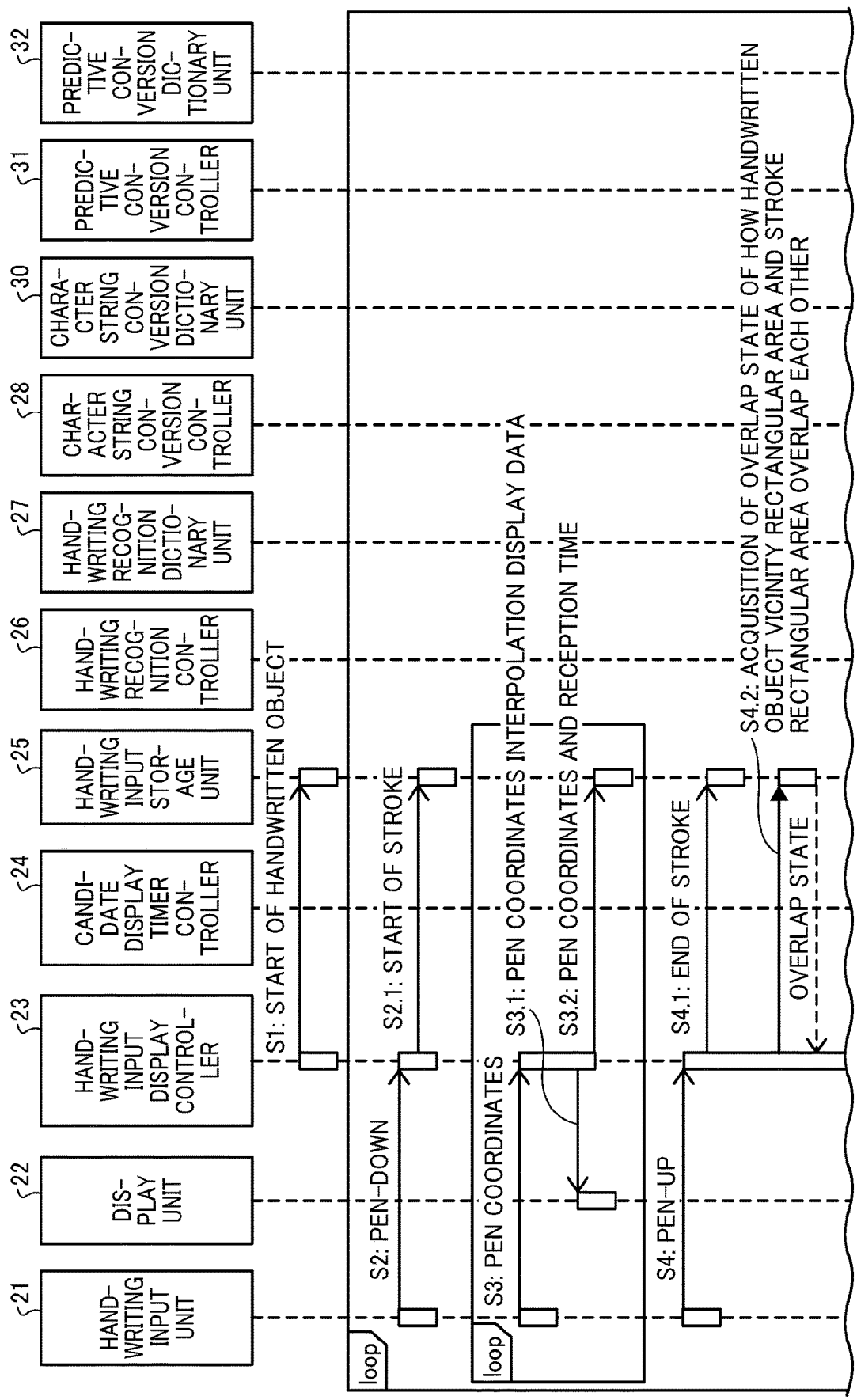
FIG. 6 is a sequence diagram illustrating an operation according to an embodiment of the present disclosure.

A description is given now of a functional configuration of the handwriting input apparatus 2, with reference to FIG. 5. FIG. 5 is a block diagram illustrating an example of a functional configuration of the handwriting input apparatus 2.

The handwriting input apparatus 2 includes a handwriting input unit 21, a display unit 22, a handwriting input display controller 23, a candidate display timer controller 24, a handwriting input storage unit 25, a handwriting recognition controller 26, a handwriting recognition dictionary unit 27, a character string conversion controller 28, a character string conversion dictionary unit 30, a predictive conversion controller 31, and a predictive conversion dictionary unit 32. Each function of the handwriting input apparatus 2 is implemented by one or more hardware elements illustrated in FIG. 4 and execution of the program.

The handwriting input unit 21, which is implemented by, for example, the touch sensor 216, receives handwriting input. The handwriting input unit 21 converts an operation (S201) of the electronic pen 2500 by a user into pen operation data (pen-up, pen-down, or pen coordinate data) and transmits the conversion result to the handwriting input display controller 23 (S202). Usually, pen coordinate data is transmitted at regular intervals as discrete values, and coordinates between discrete values are complementarily calculated. In the present embodiment, a pen-up state is a state in which the handwriting input unit 21 described later determines that the electronic pen 2500 is apart from a surface for handwriting of the display 220. A pen-up down is a state in which the handwriting input unit 21 described later determines that the electronic pen 2500 is in contact with the surface for handwriting of the display 220.

The electronic pen 2500 is an example of input means. The electronic pen 2500 can have any suitable shape other than a pen shape. The input means may be any device or means, provided that it allows a user to handwrite an object or a stroke on the touch panel. Examples of the input means include a pen, a person's finger or hand, and a rod-shaped member. The pen-up state is an example of an input means up state, and the pen-down state is an example of an input means down state.

The display unit 22 is implemented by the display 220, for example. The display unit 22 receives drawing data written in a video memory by the handwriting input display controller 23 (S203), converts the received drawing data into data according to the characteristics of the display 220, and performs display based on the converted data.

The handwriting input display controller 23 is implemented by instructions from the CPU 201. The handwriting input display controller 23 is a handwriting input display controller, which is a feature of the present embodiment, and performs overall control regarding handwriting input and display. The handwriting input display controller 23 processes the pen operation data transmitted from the handwriting input unit 21 and transmits the processed data to the display unit 22. The display unit 22 displays a stroke according to the received pen operation data. A detailed description is given later of processing of the pen operation data and display of a stroke, with reference to FIG. 6 to FIG. 11.

The candidate display timer controller 24, which is implemented by instructions from the CPU 201, is a display control timer for controlling display of a character string candidate. The candidate display timer controller 24 starts or stops a timer to generate a timing of starting display of the character string candidate and a timing of erasing the display. The character string candidate includes a handwriting recognition character string candidate, a language character string candidate, a conversion character string candidate, and a character string/predictive conversion candidate, which are displayed to be selected on an operation guide 510 (see FIG. 13) described below. The candidate display timer controller 24 receives a timer start request (or timer stop request) from the handwriting input display controller 23 (S204), and transmits a time-out event to the handwriting input display controller 23 (S205).

The handwriting input storage unit 25, which is implemented by, for example, the RAM 203, is a storage for storing user data (a handwritten object and a character string object). This handwritten object is determined based on the pen operation data indicating an operation of the electronic pen 2500 to the handwriting input unit 21. The handwritten object includes a stroke (stroke data) drawn by the electronic pen 2500. The handwritten object is a character, a number, a symbol or a figure represented by a stroke (stroke data). The handwritten object is data as a target of handwriting recognition by the handwriting recognition controller 26 described later. The character string object is data displayed on the display 220 as a result of string conversion based on the handwritten object. The handwriting input storage unit 25 receives user data from the handwriting input display controller 23 and stores the received user data. The handwriting input storage unit 25 receives an acquisition request from the handwriting input display controller 23 (S206), and transmits the stored user data to the handwriting input display controller 23 (S207).

The handwriting recognition controller 26 is a recognition engine that performs online handwriting recognition, which is implemented by instructions from the CPU 201. Unlike an optical character reader (OCR) that scans a paper document to recognize text, the handwriting recognition controller 26 reads characters (multilingual languages such as English as well as Japanese), numbers and symbols (%, $, &, etc.), figures (lines, circles, triangles, etc.) concurrently with a pen operation by a user. Although various algorithms have been proposed for the recognition method, a detailed description is omitted on the assumption that known techniques can be used in the present embodiment. Further, the handwriting recognition controller 26 receives the pen operation data from the handwriting input display controller 23 (S208), executes handwriting recognition, and holds a handwriting recognition character string candidate. Furthermore, the handwriting recognition controller 26 uses the handwriting recognition dictionary unit 27 to convert the handwriting recognition character string candidate into a language character string candidate, and holds the language character string candidate. In response to separately receiving an acquisition request from the handwriting input display controller 23 (S208), the handwriting recognition controller 26 transmits the held handwriting recognition character string candidate and the language character string candidate to the handwriting input display controller 23 (S209).

The handwriting recognition dictionary unit 27 is dictionary data for language conversion of handwriting recognition. The handwriting recognition dictionary unit 27 is stored in the SSD 204, for example. The handwriting recognition dictionary unit 27 receives the handwriting recognition character string candidate from the handwriting recognition controller 26 (S212). Further, the handwriting recognition dictionary unit 27 converts the received handwriting recognition character string candidate into a language character string candidate, which is probable linguistically, and transmits the language character string candidate to the handwriting recognition controller 26 (S213). For example, in the case of Japanese, the handwriting recognition dictionary unit 27 converts hiragana into kanji or katakana.

The character string conversion controller 28, which is implemented by instructions from the CPU 201, controls conversion of a character string. The character string conversion controller 28 receives the handwriting recognition character string candidate from the handwriting recognition controller 26 (S211). Further, the character string conversion controller 28 uses the character string conversion dictionary unit 30 to convert the received handwriting recognition character string candidate into a conversion character string candidate, and holds the conversion character string candidate. In response to separately receiving an acquisition request (S214), the character string conversion controller 28 transmits the held conversion character string candidate to the handwriting input display controller 23 (S215).

The character string conversion dictionary unit 30 is dictionary data for character string conversion. The character string conversion dictionary unit 30 is stored in the SSD 204, for example. In response to receiving the handwriting recognition character string candidate from the character string conversion controller 28 (S217), the character string conversion dictionary unit 30 transmits the conversion character string candidate to the character string conversion controller 28 (S218).

The predictive conversion controller 31, which is implemented by instructions from the CPU 201, controls predictive conversion. The predictive conversion controller 31 receives the handwriting recognition character string candidate from the handwriting recognition controller 26 (S210), and receives the conversion character string candidate from the character string conversion controller 28 (S216). The predictive conversion controller 31 uses the predictive conversion dictionary unit 32 to convert the received handwriting recognition character string candidate and conversion character string candidate into a predictive character string candidate. The predictive conversion character string is character string that is likely to be generated including the handwriting recognition character string or the conversion character string. In response to separately receiving an acquisition request from the handwriting input display controller 23 (S219), the predictive conversion controller 31 transmits the predictive character string candidate to the handwriting input display controller 23 (S220).

The predictive conversion dictionary unit 32 is dictionary data for predictive conversion. The predictive conversion dictionary unit 32 is stored in the SSD 204, for example. In response to receiving the handwriting recognition character string candidate and the conversion character string candidate from the predictive conversion controller 31 (S221), the predictive conversion dictionary unit 32 transmits the predictive character string candidate to the predictive conversion controller 31 (S222).

<Operation or Processes of Embodiment>

A description is given now of an operation or processes according to the present embodiment, with reference to FIG. 6 to FIG. 21.

(Control Sequence)

First, a description is given of a control sequence according to the present embodiment, with reference to FIG. 6 to FIG. 11. FIG. 6 to FIG. 11 are sequence diagrams illustrating an operation according to the present embodiment.

First, the handwriting input display controller 23 transmits handwritten object start information to the handwriting input storage unit 25 (S1). In response to receiving the handwritten object start information, the handwriting input storage unit 25 allocates a handwritten object area (a memory area for storing a handwritten object). In another example, the handwriting input storage unit 25 allocates the handwritten object area after the user brings the electronic pen 2500 into contact with the handwriting input unit 21.

Next, when a user brings the electronic pen 2500 into contact with the handwriting input unit 21, the handwriting input unit 21 sends the pen-down state to the handwriting input display controller 23 (S2). The handwriting input display controller 23 transmits, to the handwriting input storage unit 25, stroke start information indicating a start of a stroke drawn by the electronic pen 2500 (S2.1). The handwriting input storage unit 25 allocates a stroke area. The stroke (stroke data) is a line that a user draws freely by, for example, the electronic pen 2500. The stroke has a set of consecutive points. The points can be interpolated as appropriate.

When a user moves the electronic pen 2500 while the electronic pen 2500 is in contact with the handwriting input unit 21, the handwriting input unit 21 transmits pen coordinates to the handwriting input display controller 23 (S3). The handwriting input display controller 23 transmits pen coordinates interpolation display data, which is stroke data obtained by interpolating discrete pen coordinates, to the display unit 22 (S3.1). In response to receiving the pen coordinates interpolation display data, the display unit 22 interpolates the pen coordinates using the pen coordinates interpolation display data to display a line (stroke). Furthermore, the handwriting input display controller 23 transmits the pen coordinates and the reception time of the pen coordinates to the handwriting input storage unit 25. The handwriting input storage unit 25 adds the pen coordinates to the stroke (S3.2). The handwriting input unit 21 periodically repeats transmission of pen coordinates to the handwriting input display controller 23 (S3) during a time period when the user moving the electronic pen 2500. Accordingly, the processes of S3 to S3.2 are repeated until the pen-up state is detected.

On the other hand, when the user brings the electronic pen 2500 apart from the handwriting input unit 21, the handwriting input unit 21 transmits the pen-up state to the handwriting input display controller 23 (S4). The handwriting input display controller 23 transmits stroke end information to the handwriting input storage unit 25. In response to receiving the stroke end information, the handwriting input storage unit 25 causes the pen coordinates of the stroke to be fixed (S4.1). Once the pen coordinates of the stroke have been fixed, no further pen coordinates are added to the stroke. Next, the handwriting input display controller 23 transmits, to the handwriting input storage unit 25, a request for acquiring an overlapping state of a handwritten object vicinity rectangular area and a stroke rectangular area (S4.2). The handwriting input storage unit 25 calculates the handwritten object vicinity rectangular area and the stroke rectangular area and transmits information indicating the overlapping state to the handwriting input display controller 23.

Figure 7:
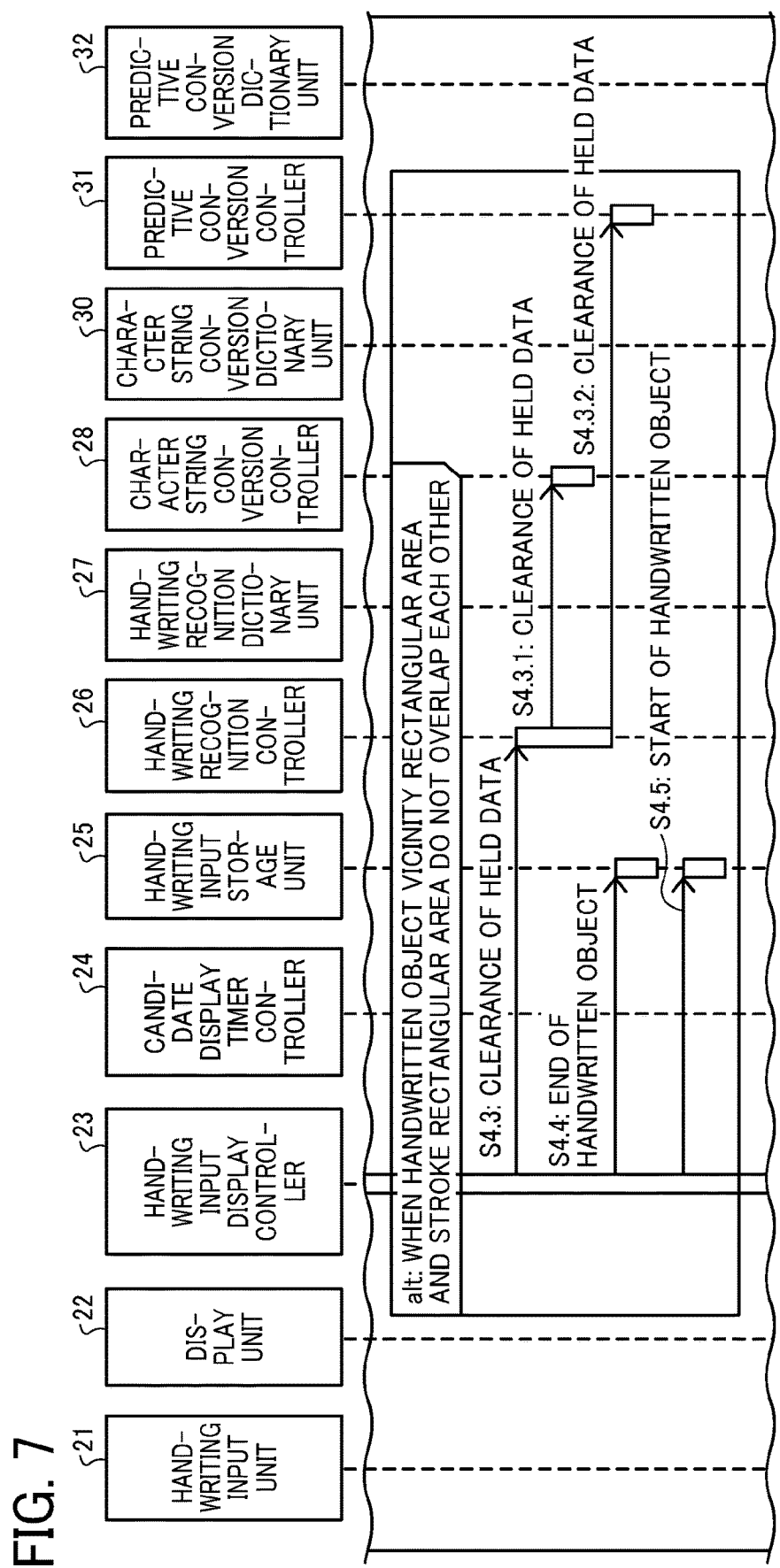
FIG. 7 is a sequence diagram illustrating an operation according to an embodiment of the present disclosure.

When the handwritten object vicinity rectangular area and the stroke rectangular area do not overlap each other, one handwritten object is determined, and therefore, as illustrated in FIG. 7, the handwriting input display controller 23 transmits held data clearance information to the handwriting recognition controller 26 (S4.3). The handwriting recognition controller 26 transmits the held data clearance information to the character string conversion controller 28. The character string conversion controller 28 clears data relating to the conversion character string candidate currently being held (S4.3.1). Further, the handwriting recognition controller 26 transmits the held data clearance information to the predictive conversion controller 31. The predictive conversion controller 31 clears data relating to the predictive character string candidate currently being held (S4.3.2). At the time of the clearing, the stroke drawn immediately before the clearing handwritten last is not added to the handwritten object.

The handwriting input display controller 23 transmits handwritten object end information to the handwriting input storage unit 25 (S4.4). In response to receiving the handwritten object end information, the handwriting input storage unit 25 fixes the handwritten object. Fixing the handwritten object refers to that one handwritten object is completed. In other words, Fixing the handwritten object refers to that any stroke is not added any more. Further, the handwriting input display controller 23 transmits handwritten object start information to the handwriting input storage unit 25 (S4.5). In response to receiving the handwritten object start information, the handwriting input storage unit 25 allocates a new handwritten object area in preparation for a start (pen-down) of handwriting of a next handwritten object.

Figure 8:
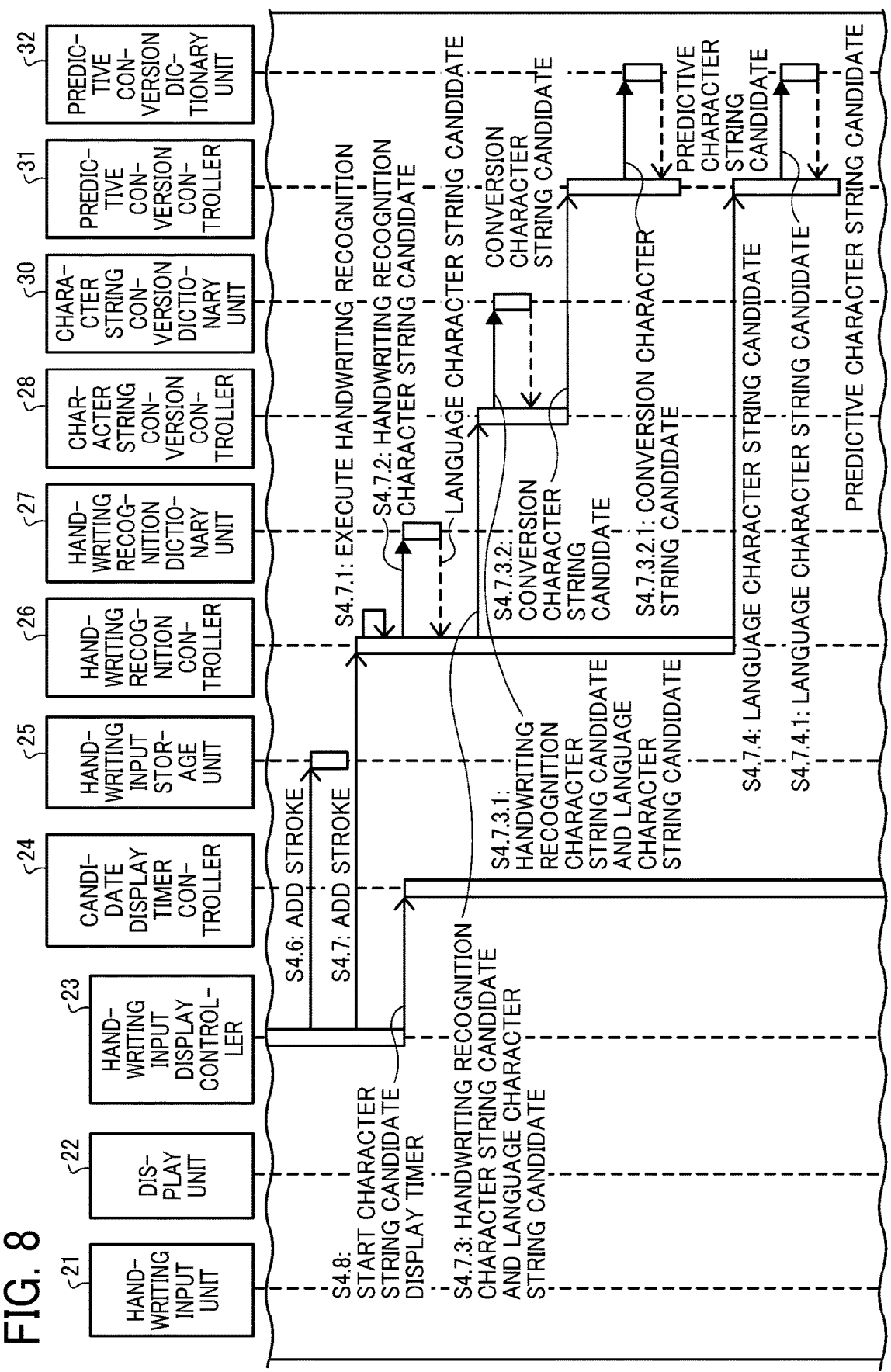
FIG. 8 is a sequence diagram illustrating an operation according to an embodiment of the present disclosure.

Next, as illustrated in FIG. 8, the handwriting input display controller 23 transmits stroke data to be added relating to the stroke that ended in S4.1 to the handwriting input storage unit 25. When the processes from S4.3 to S4.5 are executed, a stroke to be added is a first stroke of the handwritten object. Accordingly, the handwriting input storage unit 25 adds stroke data to the handwritten object being started (S4.6). When the process from S4.3 to S4.5 are not executed, the stroke to be added is added to the handwritten object that has been already handwritten. Next, the handwriting input display controller 23 transmits the stroke data to be added to the handwriting recognition controller 26. The handwriting recognition controller 26 adds the stroke data to a stroke data holding area, which is an area where stroke data is temporarily stored, relating to a character string candidate (S4.7).

Next, the handwriting recognition controller 26 executes handwriting recognition on the stroke data holding area (S4.7.1). The handwriting recognition controller 26 transmits a handwriting recognition character string candidate, which is a result of the execution of handwriting recognition, to the handwriting recognition dictionary unit 27 (S4.7.2). The handwriting recognition dictionary unit 27 transmits a language character string candidate, which is probable linguistically, to the handwriting recognition controller 26.

Next, the handwriting recognition controller 26 transmits the handwriting recognition character string candidate and the received language character string candidate to the character string conversion controller 28 (S4.7.3). The character string conversion controller 28 transmits the handwriting recognition character string candidate and the language character string candidate to the character string conversion dictionary unit 30 (S4.7.3.1). In response, the character string conversion dictionary unit 30 transmits a conversion character string candidate to the character string conversion controller 28. Further, the character string conversion controller 28 transmits the received conversion character string candidate to the predictive conversion controller 31 (S4.7.3.2). The predictive conversion controller 31 transmits the received conversion character string candidate to the predictive conversion dictionary unit 32 (S4.7.3.2.1). The predictive conversion dictionary unit 32 transmits a predictive character string candidate to the predictive conversion controller 31.

The handwriting recognition controller 26, the character string conversion controller 28, and the predictive conversion controller 31 respectively stores the handwriting recognition character string candidate, the language character string candidate, the conversion character string candidate, and the predictive character string candidate so that the handwriting input display controller 23 can acquire these candidates in the processes from S4.8.1.2 to S4.8.1.3 described below.

Figure 9:
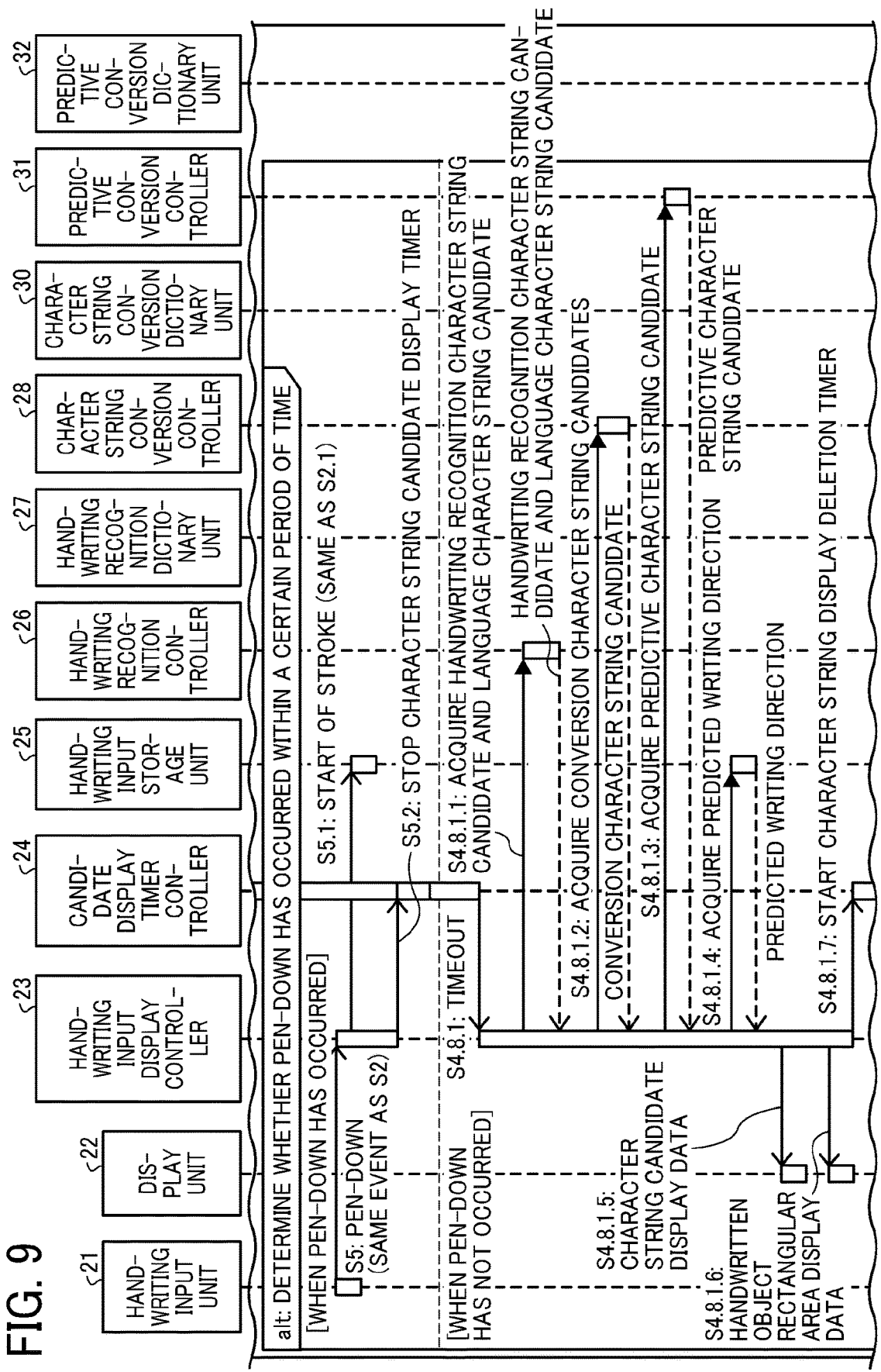
FIG. 9 is a sequence diagram illustrating an operation according to an embodiment of the present disclosure.

Further, the handwriting input display controller 23 transmits a request for starting a character string candidate display timer to the candidate display timer controller 24, immediately after transmitting to the handwriting recognition controller 26, in step S4.7, the stroke data to be added. The candidate display timer controller 24 starts counting of the character string candidate display timer (S4.8). When the user brings the electronic pen 2500 into contact with the handwriting input unit 21 before the timer times out, the handwriting input unit 21 transmits pen-down information (the same event as S2) to the handwriting input display controller 23 (S5), as illustrated in FIG. 9. The handwriting input display controller 23 transmits stroke start information (the same information as that transmitted in S2.1) to the handwriting input storage unit 25 (S5.1). After S5.1, processes that are the same or substantially the same as the processes of S2.1 and subsequent steps are performed.

Further, the handwriting input display controller 23 transmits character string candidate display timer stop information to the candidate display timer controller 24. The candidate display timer controller 24 stops the timer (S5.2). This is because the timer is not needed any more since the pen-down is detected.

Figure 13:
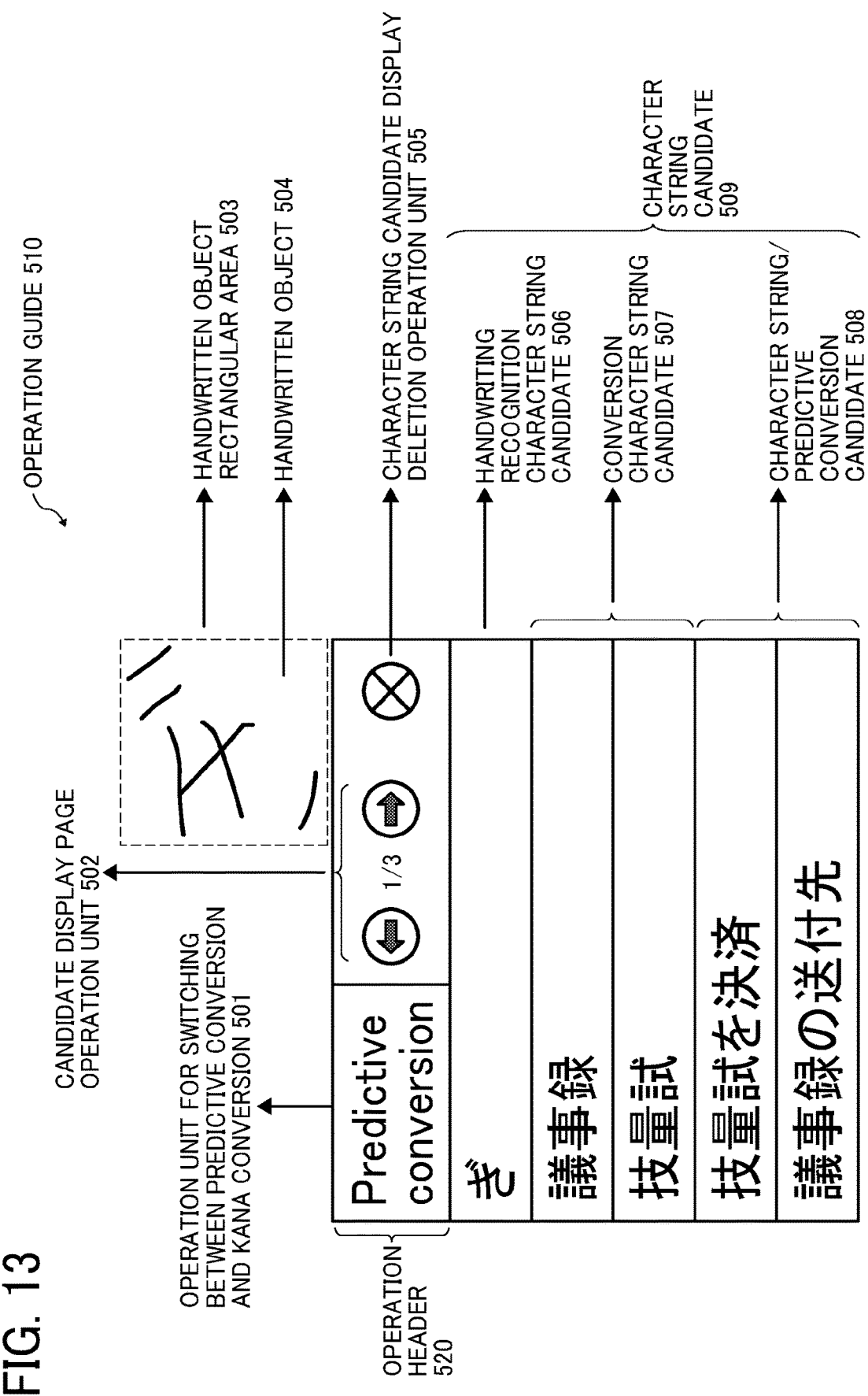
FIG. 13 is a diagram illustrating an example of a configuration of a character string candidate display area, according to an embodiment of the present disclosure.

Processes from S4.8.1 to S7.10 described below are executed when the pen-down does not occur before a certain time elapses (before the timer times out). Therefore, the operation guide 510 as described below with reference to FIG. 13 is displayed on the display unit 22. When the user does not perform a pen operation before a certain time elapses after the character string candidate display timer started in step S4.8 (when the electronic pen 2500 is not brought into contact with the handwriting input unit 21), the candidate display timer controller 24 transmits time-out information to the handwriting input display controller 23 (S 4.8.1).

The handwriting input display controller 23 transmits a request for acquiring a handwriting recognition character string candidate or a language character string candidate to the handwriting recognition controller 26 (S4.8.1.1). In response to receiving the request, the handwriting recognition controller 26 transmits the handwriting recognition character string candidate or the language character string candidate that are currently being held to the handwriting input display controller 23.

Next, the handwriting input display controller 23 transmits a request for acquiring a conversion character string candidate to the character string conversion controller 28 (S4.8.1.2). In response to receiving the request, the character string conversion controller 28 transmits the conversion character string candidate that is currently held to the handwriting input display controller 23.

Further, the handwriting input display controller 23 transmits a request for acquiring a predictive character string candidate to the predictive conversion controller 31 (S4.8.1.3). In response to receiving the request, the predictive conversion controller 31 transmits the predictive character string candidate that is currently held to the handwriting input display controller 23.

Furthermore, the handwriting input display controller 23 transmits a request for acquiring a predicted writing direction to the handwriting input storage unit 25 (S4.8.1.4). In response to receiving the request, the handwriting input storage unit 25 determines the writing direction based on a stroke addition time, a horizontal distance, and a vertical distance of a handwritten object rectangular area. The handwriting input storage unit 25 transmits the determined handwriting direction as the predicted writing direction to the handwriting input display controller 23.

Next, the handwriting input display controller 23 generates character string candidate display data based on the handwriting recognition character string candidate (e.g., "ぎ" in FIG. 13), the language character string candidate (e.g., "議", although not illustrated in FIG. 13), the conversion character string candidate (e.g., "議事録" and "技量試" in FIG. 13), the predictive character string candidate (e.g., "技量試を決済" and "議事録の送付" in FIG. 13), the selection probability of each candidate, and the predicted writing direction. It should be noted that "ぎ" is Japanese hiragana character that is pronounced as "gi", and "議" is Japanese kanji character that is also pronounced as "gi". The example of conversion character string candidate "議事録" means "minutes" and pronounced as "gijiroku", and "技量試" is pronounced as "giryoushi". The example of the predictive character string candidate "技量試 を決済" means "approve technical pre-production" and pronounced as "giryoushi-wo-kessai and "議事録の送付" means "send minutes" and pronounced as "gijiroku-no-souhu". The handwriting input display controller 23 transmits the generated character string candidate display data to the display unit 22. In response to receiving the character string candidate display data, the display unit 22 displays character string candidates 509 (see FIG. 13) (S4.8.1.5). Further, the handwriting input display controller 23 transmits object rectangular area display data to the display unit 22. In response to receiving the object rectangular area display data, the display unit 22 displays a handwritten object rectangular area 503 (see FIG. 13) (S4.8.1.6).

Furthermore, the handwriting input display controller 23 transmits, to the candidate display timer controller 24, a request for starting a character string candidate display deletion timer used for erasing the character string candidates 509 after a predetermined time from the display of the character string candidates 509. The handwriting input display controller 23 starts counting of character string candidate display deletion timer (S4.8.1.7).

Figure 10:
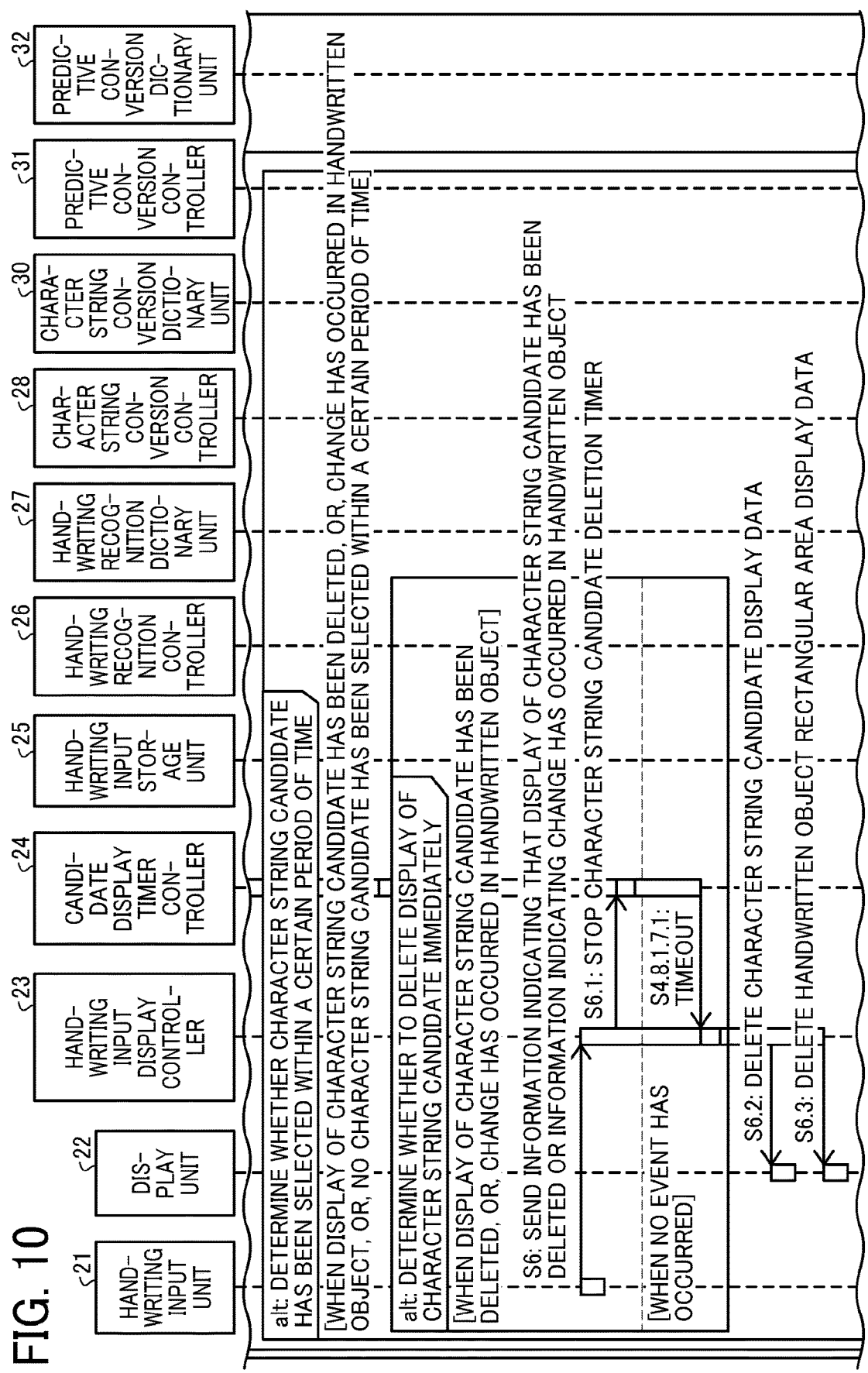
FIG. 10 is a sequence diagram illustrating an operation according to an embodiment of the present disclosure.

When the user has erased the character string candidates 509 displayed on the display unit 22 or when a change has occurred in the handwritten object (i.e., when a stroke is added or deleted from a handwritten object or a handwritten object is moved, deformed or divided) before a certain time has elapsed since the character string candidate deletion timer started by the process of S4.8.1.7, the handwriting input unit 21 transmits information indicating the erase of the display of the character string candidates 509 or information indicating the occurrence of the change of the handwritten object to the handwriting input display controller 23 (S6), as illustrated in FIG. 10. The handwriting input display controller 23 transmits a request for stopping the character string candidate display deletion timer to the candidate display timer controller 24. The candidate display timer controller 24 stops the character string candidate display deletion timer (S6.1). This is because the timer is not needed any more since an operation to the handwritten object is detected. The handwriting input display controller 23 transmits, to the display unit 22, a request for deleting the character string candidate display data, to cause the display unit 22 to delete the display (S6.2). Furthermore, the handwriting input display controller 23 transmits, to the display unit 22, a request for deleting the handwritten object rectangular area display data, to cause the display unit 22 to delete the display (S6.3).

By contrast, when the display of the character string candidates 509 is not erased or when no change occurs in the handwritten object (when the user does not operate the electronic pen 2500), the candidate display timer controller 24 transmits time-out information to the handwriting input display controller 23 (S4.8.1.7.1). In response to receiving the time-out information, the handwriting input display controller 23 transmits, to the display unit 22, a request for deleting the character string candidate display data, to cause the display unit 22 to delete the display (S6.2). Furthermore, the handwriting input display controller 23 transmits, to the display unit 22, a request for deleting the handwritten object rectangular area display data, to cause the display unit 22 to delete the display (S6.3).

Figure 11:
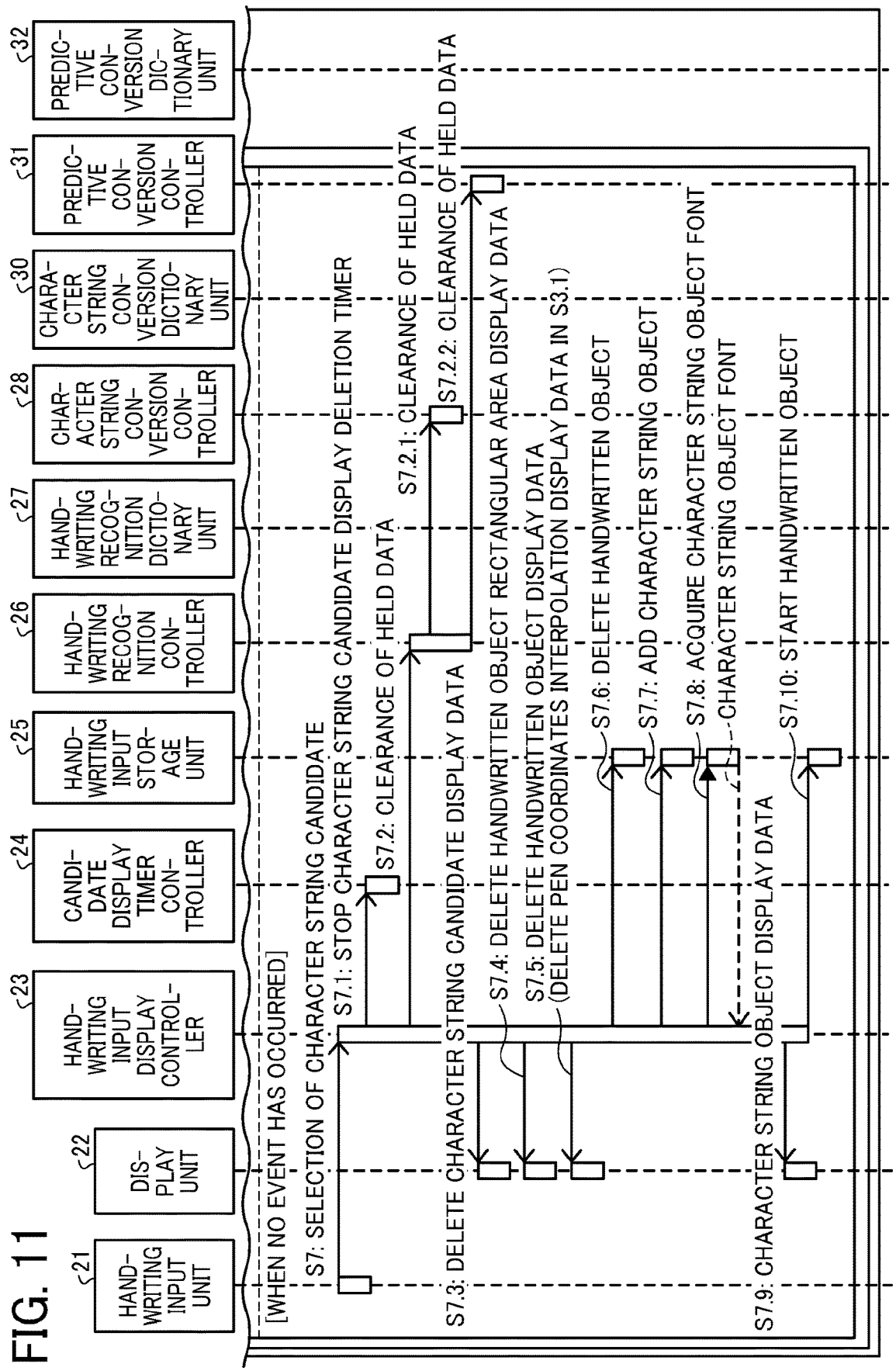
FIG. 11 is a sequence diagram illustrating an operation according to an embodiment of the present disclosure.

Further, when the user selects a character string candidate before a certain time has elapsed since the character string candidate deletion timer started by the process of S4.8.1.7 in FIG. 9, the handwriting input unit 21 transmits information indicating the selection of the character string candidate to the handwriting input display controller 23, as illustrated in FIG. 11 (S7). In response to receiving the information, the handwriting input display controller 23 transmits a request for stopping the character string candidate display deletion timer to the candidate display timer controller 24. The candidate display timer controller 24 stops counting of the character string candidate display deletion timer (S7.1).

Next, the handwriting input display controller 23 transmits the held data clearance information to the handwriting recognition controller 26 (S7.2). The handwriting recognition controller 26 transmits the held data clearance information to the character string conversion controller 28 (S7.2.1) and to the predictive conversion controller 31 (S7.2.2). In response to receiving the held data clearance information, the handwriting recognition controller 26, the character string conversion controller 28, and the predictive conversion controller 31 clear data relating to the character string candidates currently being held.

Next, the handwriting input display controller 23 transmits, to the display unit 22, a request for deleting the character string candidate display data, to cause the display unit 22 to delete the display of the character string candidates 509 (S7.3). Further, the handwriting input display controller 23 transmits, to the display unit 22, a request for deleting the handwritten object rectangular area display data, to cause the display unit 22 to delete the display (S7.4). Furthermore, the handwriting input display controller 23 transmits a request for deleting the handwritten object display data (a request for deleting the pen coordinates interpolation display data in step S3.1), to cause the display unit 22 to erase the display (S7.5). This is because the handwritten object or the like is no more need, since the character string candidate is selected.

The handwriting input display controller 23 transmits the handwritten object deletion information to the handwriting input storage unit 25 (S7.6). Further, the handwriting input display controller 23 transmits a character string object addition information to the handwriting input storage unit 25 (S7.7). Furthermore, the handwriting input display controller 23 transmits a request for acquiring a character string object font to the handwriting input storage unit 25 (S7.8). In response to receiving the request, the handwriting input storage unit 25 selects a predefined font based on a predicted character size of the handwritten object, and transmits the selected font to the handwriting input display controller 23.

The handwriting input display controller 23 uses the predefined font received from the handwriting input storage unit 25 to transmit, to the display unit 22, character string object display data based on which a character string object is to be displayed at the same position as the handwritten object. The display unit 22 displays the character string object (S7.9). Further, the handwriting input display controller 23 transmits start information of a handwritten object to the handwriting input storage unit 25 for the next handwritten object. The handwriting input storage unit 25 allocates a handwritten object area (S7.10). After the completion of the process of step S7.10, the processes from S2 of FIG. 6 to S7.10 of FIG. 11 are repeated.

(Example of Predefined Data)

A description is now given of predefined data that is used by the handwriting input apparatus 2 for various types of processing, with reference to FIG. 12. FIG. 12 is a diagram illustrating an example of predefined control data. The example of FIG. 12 illustrates predefined data for each predefined item.

A character string candidate display timer 401 defines a period of time to be counted until the character string candidates are displayed. Such period of time is predefined for preventing the character string candidates 509 from being displayed during handwriting. The character string candidate display timer 401 is used when starting counting of the character string candidate display timer in step S4.8 of FIG. 8. In this example, in a case where the pen-down does not occur within 500 milliseconds (TimerValue) from the pen up, the character string candidates 509 are displayed. The candidate display timer controller 24 holds the character string candidate display timer 401.

A character string candidate deletion timer 402 defines a period of time to be counted until the displayed character string candidates 509 are to be erased. Such period of time is predefined to erase the character string candidate 509 when a user does not select a character string candidate. The character string candidate deletion timer 402 is used when starting counting to the character string candidate display deletion timer in step S4.8.1.7 of FIG. 9. In this example, in a case where no character string candidate selected within 5000 milliseconds (TimerValue) from the display of the character string candidates 509, the display of the character string candidates 509 is erased. The candidate display timer controller 24 holds the character string candidate deletion timer 402.

A handwritten object vicinity rectangular area 403 defines a rectangular area regarded as the vicinity of a handwritten object. The handwritten object vicinity rectangular area 403 is used when determining the overlapping state of the handwritten object vicinity rectangular area and the stroke rectangular area in step S4.2 of FIG. 6. In this example, the handwritten object vicinity rectangular area 403 is a rectangular area obtained by enlarging a rectangular area of a handwritten object horizontally by 50% (Horizontal) of the predicted character size and vertically by 80% (Vertical) of the predicted character size. Although in this example, the ratio to the predicted character size (% designation) is predefined, a fixed length can be predefined while the unit is "millimeter", for example. The handwriting input storage unit 25 holds the handwritten object vicinity rectangular area 403.

The predicted writing direction/character size determination conditions 404 defines a constant for determining the measuring direction of the writing direction and the character size. The predicted writing direction/character size determination conditions 404 is used when acquiring the predicted writing direction in step S4.8.1.4 of FIG. 9 and when acquiring the character string object font in step S7.8 of FIG. 11. In this example, when the difference between the time when a stroke is first added in the handwritten object rectangular area 503 and the time when a stroke is last added is equal to or longer than 1000 milliseconds (MinTime), when the difference between the horizontal distance (width) of the handwritten object rectangular area 503 and the vertical distance (height) of the handwritten object rectangular area 503 is equal to or longer than 10 millimeters (MinDiff), and when the horizontal distance is longer than the vertical distance, the predicted writing direction is identified as a "horizontal writing direction", and the predicted character size is identified as being equal to the vertical distance. When the horizontal distance is shorter than the vertical distance, the predicted writing direction is identified as a "vertical writing direction" and the predicted character size is identified as being equal to the horizontal distance. When the above conditions are not satisfied, the predicted writing direction is identified as the "horizontal writing direction" (DefaultDir="Horizontal"), and the predicted character size is identified as being equal to one of the horizontal distance and the vertical distance, which is longer than the other. The estimated character size is compared with the minimum value (hereinafter, "minimum font size") and the maximum value (hereinafter, "maximum font size") of the "FontSize" of a predicted character size 405. When the predicted character size is equal to or smaller than the minimum font size, the predicted character size is identified as the minimum font size. When the predicted character size is equal to or larger than the maximum font size, the predicted character size is identified as the maximum font size. The handwriting input storage unit 25 holds the predicted writing direction/character size determination conditions 404.

The predicted character size 405 defines data for predicting the size of a character or the like. The predicted character size 405 is used in acquiring the overlapping state of the handwritten object vicinity rectangular area and the stroke rectangular area in step S4.2 of FIG. 6 and acquiring the character string object font in step S7.8 of FIG. 11. In this example, the predicted character size determined based on the predicted writing direction/character size determination conditions 404 is compared with a relatively small-sized character 405a (hereinafter, referred to as "minimum font size") and a relatively large-sized character size 405c (hereinafter, referred to as a "maximum font size") of the predicted character size 405. When the predicted character size is equal to or smaller than the minimum font size, the predicted character size is identified as the minimum font size. When the predicted character size is equal to or larger than the maximum font size, the predicted character size is identified as the maximum font size. When the predicted character size is larger than the minimum font size and smaller than the maximum font size, the predicted character size is identified as a relatively medium-sized character 405b. The handwriting input storage unit 25 holds the predicted character size 405.

Specifically, the handwriting input storage unit 25 compares the predicted character size determined based on the predicted writing direction/character size determination conditions 404 with the font size of the predicted character size 405 and uses the closest font. In other words, when the predicted character size is equal to or less than 25 millimeters (font size of the relatively small-sized character), the character size is identified as the "relatively small-sized character". When the predicted character size is more than 25 millimeters and equal to or less than 50 millimeters (font size of the relatively medium-sized character), the character size is identified as the "relatively medium-sized character". When the predicted character size is more than 100 millimeters (font size of relatively large-sized characters), the character size is identified as the "relatively large-sized characters". A "relatively small-sized character" 405a uses a Mincho 25 mm font (FontStyle="Mincho font", "FontSize=25"). A "relatively medium-sized character" 405b is a Mincho 50 mm font (FontStyle="Mincho", FontSize="50 mm"). A "relatively large-sized character" 405c uses a Gothic 100 mm font (FontStyle="gothic", FontSize="100 mm"). The number of the font size or font style can be increased by increasing the type of the predicted character size 405. The font style ("FontStyle") defined as the predicted character size 405 is an example of a predefined font style. The font size ("FontSize") defined as the predicted character size 405 is an example of a predefined font size.

(Example of Configuration of Display of Character String Candidates)

FIG. 13 is a diagram illustrating an example of a configuration of a character string candidate display area. In response to handwriting of handwritten object 504 by a user, the (in response to the timeout of the character string candidate display timer 401), the operation guide 510 is displayed. The operation guide 510 includes an operation header 520, a handwritten object rectangular area 503, a handwritten object 504, and the character string candidates 509. The operation header 520 includes an operation unit 501 for switching between predictive conversion and kana conversion, a candidate display page operation unit 502, and a character string candidate display deletion operation unit 505. The character string candidates 509 includes a handwriting recognition character string candidate 506, conversion character string candidates 507, and character string/predictive conversion candidates 508. Although in the example of FIG. 13, no language character string candidate is displayed, there is also a case where one or more language character string candidates are displayed.

The operation unit 501 for switching between predictive conversion and kana conversion is a button for receiving a switching operation between prediction conversion and kana conversion. In this example, when a user presses a button labeled "Predictive conversion" with the electronic pen 2500 or the like, the handwriting input unit 21 receives the user's operation and sends information notifying that the button is pressed to the handwriting input display controller 23. The handwriting input display controller 23 transmits a switching notification to the display unit 22. In response to receiving the switching notification, the display unit 22 changes the label of the button to "Kana conversion". As a result, character string candidates are arranged in descending order of probability of kana conversion.

The candidate display page operation unit 502 is a button for receiving an operation for switching from one page displaying candidates to another page displaying other candidates. In the example of FIG. 13, there are three pages for displaying candidates, and the first page is currently displayed.

The handwritten object rectangular area 503 is an area surrounding the handwritten object 504. In this example, the handwritten object rectangular area 503 is represented by a frame of a dashed line.

The handwritten object 504 is a character "  " (Japanese hiragana character, pronounced as "gi") handwritten by the user.

The character string candidate display deletion operation unit 505 is a button for receiving an operation of erasing the character string candidates 509. In this example, when the user presses an "X" icon with the electronic pen 2500 or the like, the handwriting input unit 21 receives the user's operation and send information notifying that the "X" icon is pressed to the handwriting input display controller 23. The handwriting input display controller 23 transmits erase information of the character string candidate display data to the display unit 22. In response to receiving the erase information, the display unit 22 erases the display of objects or information other than the handwritten object 504.

In the handwriting recognition character string candidate 506, the conversion character string candidates 507, and the character string/prediction conversion candidates 508, respective character string candidates are arranged in descending order of probability.

" ぎ " (Japanese hiragana character, pronounced as "gi") displayed as the handwriting recognition character string candidate 506 is a candidate for the result of handwriting recognition. In this example, " ぎ " (Japanese hiragana character, pronounced as "gi") is recognized correctly.

The conversion character string candidates 507 are conversion character string candidates converted from the language character string candidate. " 技量試 " (Japanese kanji character, pronounced as "giryoshi") displayed as one of the conversion character string candidate 507 is a candidate of character string conversion. In this example, " 技量試 " is an abbreviation of " 技術量産試作 " (Japanese kanji character, meaning "technical pre-production" and pronounced as "gijutsu-ryousan-shisaku".)

The character string/predictive conversion candidates 508 are predictive character string candidates converted from the language character string candidate or the conversion character string candidate. " 技量試を決裁 " (meaning "approve technical pre-production" and pronounced as "giryoshi-wo-kessai") and " 議事録の送付先 " (meaning "destination of minutes" and pronounced as "gijiroku-no-souhusaki") displayed as the character string/predictive conversion candidate 508 are candidates of character string conversion or candidates of predictive conversion.

(Example of Dictionary Data)

FIG. 14A, FIG. 14B and FIG. 14C are diagrams, each illustrating an example of dictionary data. FIG. 14A is an illustration of an example of data structure of handwriting recognition dictionary data 601 corresponding to the handwriting recognition dictionary unit 27. FIG. 14B is an illustration of an example of data structure of character string conversion dictionary data 602 corresponding to the character string conversion dictionary unit 30. FIG. 14C is an illustration of an example of data structure of predictive conversion dictionary data 603 corresponding to the predictive conversion dictionary unit 32. The dictionary data 601, 602 and 603 are used respectively in the processes of S4.7.2, S4.7.3 and S4.7.4 in FIG. 8. In the present embodiment, a conversion result acquired by the handwriting recognition dictionary unit 27 using the handwriting recognition dictionary data 601 of FIG. 14A is referred to as the language character string candidate. A conversion result by the character string conversion dictionary unit 30 using the character string conversion dictionary data 602 of FIG. 14B is referred to as the conversion character string candidate. A conversion result by the predictive conversion dictionary unit 32 using the predictive conversion dictionary data 603 of FIG. 14C is referred to as the predictive character string candidate. In each of the dictionary data 601, 602 and 603, character strings listed in the column of "Pre-conversion" represent character strings each being used as a search key for searching the dictionary data. Further, in each of the dictionary data 601, 602 and 603, character strings listed in the column of "Post-conversion" represent converted character strings corresponding to the character strings used as the search keys for searching the dictionary data. Furthermore, in each of the dictionary data 601, 602 and 603, numbers in the column of "Probability" represents the probability of the user's selection.

The example of the handwriting recognition dictionary data 601 illustrated in FIG. 14A indicates that the handwritten " ぎ " (Japanese hiragana character, pronounced as "gi") is converted to " 議 " (Japanese kanji character, pronounced as "gi") with a probability of 0.55, and converted to " 技 " (Japanese kanji character, also pronounced as "gi") with a probability of 0.45. Further, the example of the handwriting recognition dictionary data 601 illustrated in FIG. 14A indicates that the handwritten " ぎし " is converted to " 技士 " (Japanese kanji character, meaning "technician" and pronounced as "gishi") with a probability of 0.55 and converted to " 技師 " (Japanese kanji character, meaning "engineer", and also pronounced as "gishi") with a probability of 0.45. Substantially the same description is applied to other pre-conversion and post-conversion character strings, and the description thereof is omitted below in order to simplify the description. Although in this example, all handwritings are written in hiragana, characters other than hiragana can be registered.

The example of the character string conversion dictionary data 602 illustrated in FIG. 14B indicates that a character string " 議 " (Japanese kanji character, pronounced as "gi") is converted to " 議事録 " (meaning "minutes" and pronounced as "gijiroku") with a probability of 0.95, and the character string " 技 " (Japanese kanji character, also pronounced as "gi") is converted to " 技量試 " (Japanese kanji character, pronounced as "giryoshi") with a probability of 0.85. Substantially the same description is applied to other pre-conversion and post-conversion character strings, and the description thereof is omitted below in order to simplify the description.

The example of the predictive conversion dictionary data 603 illustrated in FIG. 14C indicates that the character string " 議事録 " (meaning "minutes", pronounced as "gijiroku") is converted to " 議事録の送付先 " (meaning "destination of minutes" and pronounced as "gijiroku-no-souhusaki") with a probability of 0.65, and the character string " 技量試 " (Japanese kanji character, pronounced as "giryoshi") is converted to " 技量試を決裁 " (meaning "approve technical pre-production" and pronounced as "giryoshi-wo-kessai") with a probability of 0.75. Although in this example, all post-conversion character strings are written in kanji, characters other than kanji characters can be registered.

Although various algorithms have been proposed for calculating the probability, this is not a feature of the present embodiment. Accordingly, the description of the algorithm for calculating the probability is omitted in the present embodiment. In the present embodiment, character string candidates are displayed in the descending order of selection probability based on the predicted writing direction. The dictionary data is language-independent, and any character strings can be registered in the columns of the pre-conversion and the post-conversion.

(Operation Example of Character String Candidate Display)

Figure 15:
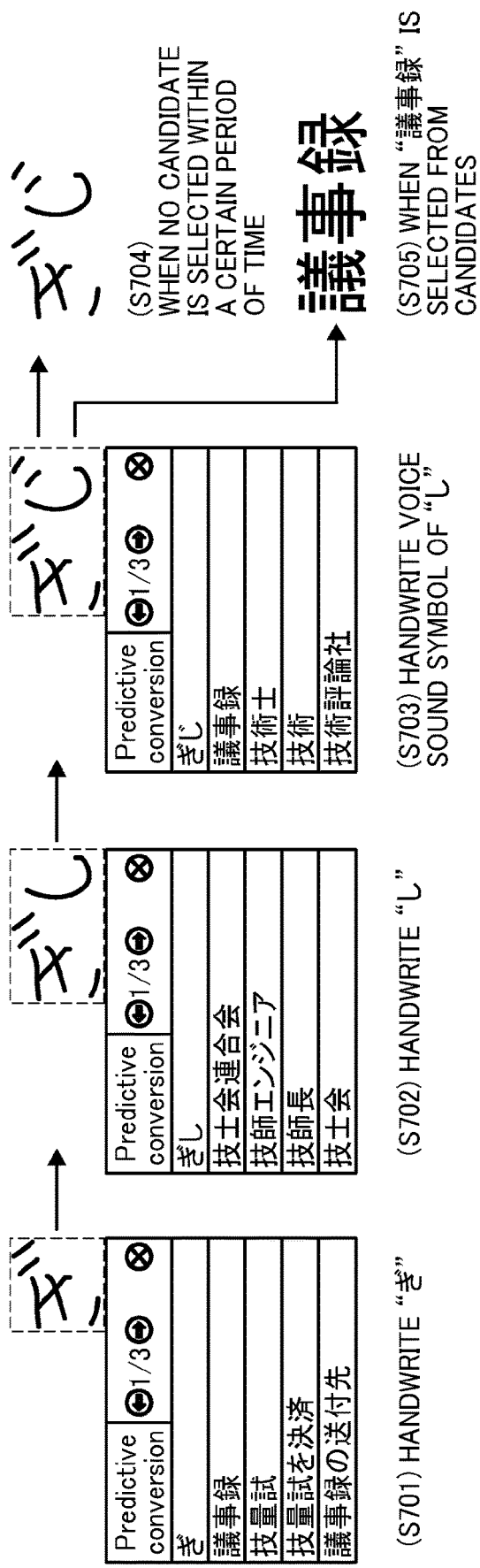
FIG. 15 is a diagram illustrating an example of an operation of a character string candidate display area, according to an embodiment of the present disclosure.

FIG. 15 is a diagram illustrating an example of an operation of a character string candidate display area. More specifically, FIG. 15 illustrates an example in which character string candidates are displayed by using the dictionary data illustrated in FIG. 14A, FIG. 14B and FIG. 14C.

The language character string candidate, the conversion character string candidate, and the predictive character string candidate, which are conversion results obtained by using the examples of dictionary data illustrated in FIG. 14A, FIG. 14B and FIG. 14C, are acquired by the processes of S4.8.1.1 to S4.8.1.3 in FIG. 9. The acquired language character string candidate, conversion character string candidate, and predictive character string candidate are displayed as character string candidates arranged in descending order of selection probability.

(S701) is a display example of the character string candidates that are displayed when "ぎ" (Japanese hiragana character, pronounced as "gi") is handwritten. First, the handwriting recognition controller 26 executes handwriting recognition to acquire "ぎ". Next, when the handwriting recognition dictionary unit 27 searches the handwriting recognition dictionary data 601 using "ぎ", which is the handwriting recognition character string candidate, as a search key, "議" (Japanese kanji character, pronounced as "gi") and "技" (Japanese kanji character, also pronounced as "gi") as indicated by the reference numeral 604 are retrieved. Each of the retrieved "議" and "技" is the language character string candidate. Next, when the character string conversion dictionary unit 30 searches the character string conversion dictionary data 602 using "議" and "技" indicated by the reference numeral 604 included in the handwriting recognition dictionary data 601 as a search key, "議事録" (meaning "minutes", pronounced as "gijiroku") and "技量試" (Japanese kanji character, pronounced as "giryoshi") indicated by the reference numeral 607 are retrieved. Each of the retrieved "議事録" and "技量試" is the conversion character string candidate. Next, when the predictive conversion dictionary unit 32 searches the predictive conversion dictionary data 603 using "議事録" and "技量試" indicated by the reference numeral 607 included in the character string conversion dictionary data 602 as a search key, "議事録の送付先" (meaning "destination of minutes" and pronounced as "gijiroku-no-souhusaki") and "技量試を決裁" (meaning "approve technical pre-production" and pronounced as "giryoshi-wo-kessai") indicated by the reference numeral 611 are retrieved. Each of the retrieved "議事録の送付先" and "技量試を決裁" is the predictive character string candidate. In the present embodiment, the handwriting recognition character string candidate is arranged as the first candidate of the character string candidates. As the second and subsequent candidates, the post-conversion character strings in the records indicated by the reference numeral 604 included in the handwriting recognition dictionary data 601, the post-conversion character strings in the records indicated by the reference numeral 607 included in the character string conversion dictionary data 602, and the post-conversion character strings in the records indicated by the reference numeral 611 in the predictive conversion dictionary data 603 are arranged in descending order of "probability". As a result, the character string candidate display as illustrated in (S701) is displayed.

(S702) is a display example of the character string candidates that are displayed when "し" (Japanese hiragana character, pronounced as "shi") is added by handwriting to (S701). When processes are performed in substantially the same manner as described above with reference to (S701), "ぎし" (Japanese hiragana character string, pronounced as "gishi") is arranged as the first candidate of the character string candidates. As the second and subsequent candidates, the post-conversion character strings in the records indicated by the reference numeral 605 included in the handwriting recognition dictionary data 601, the post-conversion character strings in the records indicated by the reference numeral 608 included in the character string conversion dictionary data 602, and the post-conversion character strings in the records indicated by the reference numeral 612 in the predictive conversion dictionary data 603 are arranged in descending order of "probability". As a result, the character string candidate display as illustrated in (S702) is displayed.

(S703) is a display example of the character string candidates that are displayed when a voice sound symbol is added to (S702) by handwriting. When processes are performed in substantially the same manner as described above with reference to (S701) and (S702), "ぎじ" (Japanese hiragana character string, pronounced as "giji") is arranged as the first candidate of the character string candidates. As the second and subsequent candidates, the post-conversion character strings in the records indicated by the reference numeral 606 included in the handwriting recognition dictionary data 601, the post-conversion character strings in the records indicated by the reference numerals 609 and 610 included in the character string conversion dictionary data 602, and the post-conversion character strings in the records indicated by the reference numerals 613 and 614 included in the predictive conversion dictionary data 603 are arranged in descending order of "probability". As a result, the character string candidate display as illustrated in (S703) is displayed.

(S704) is a display example that is displayed in a case where no character string candidate is selected within a predetermined time (for example, 5 seconds in the example of the character string candidate deletion timer 402 of FIG. 12) from (S703). More specifically, in the example illustrated in (S704), the display of the handwritten object rectangular area 503, the operation header 520, and the character string candidates 509 is erased. Further, when a user presses the "X" icon on the display of (S703) or when a change in the handwritten object occurs while (S703) is displayed, (S704) is displayed.

(S705) is a display example that is displayed in a case where "議事録" (Japanese kanji character string, meaning "minutes", and pronounced as "gijiroku") as one of the character string candidates is selected on the display of (S703). More specifically, in the example illustrated in (S705), the display of the handwritten object 504, the handwritten object rectangular area 503, the operation header 520, and the character string candidates 509 is erased. Further, when the predicted writing direction is the horizontal writing direction, the character string object "議事録" (Japanese kanji character string, meaning "minutes", and pronounced as "gijiroku") is displayed from the upper left coordinates of the handwritten object rectangular area in a predefined font selected based on the predicted character size of the handwritten object. When the predicted writing direction is the vertical writing direction, the character string object "議事録" (Japanese kanji character string, meaning "minutes", and pronounced as "gijiroku") is displayed from the upper right coordinates of the handwritten object rectangular area in the predefined font selected based on the predicted character size of the handwritten object.
(Operation Example of Predictive Conversion and Kana Conversion)

Figure 16:
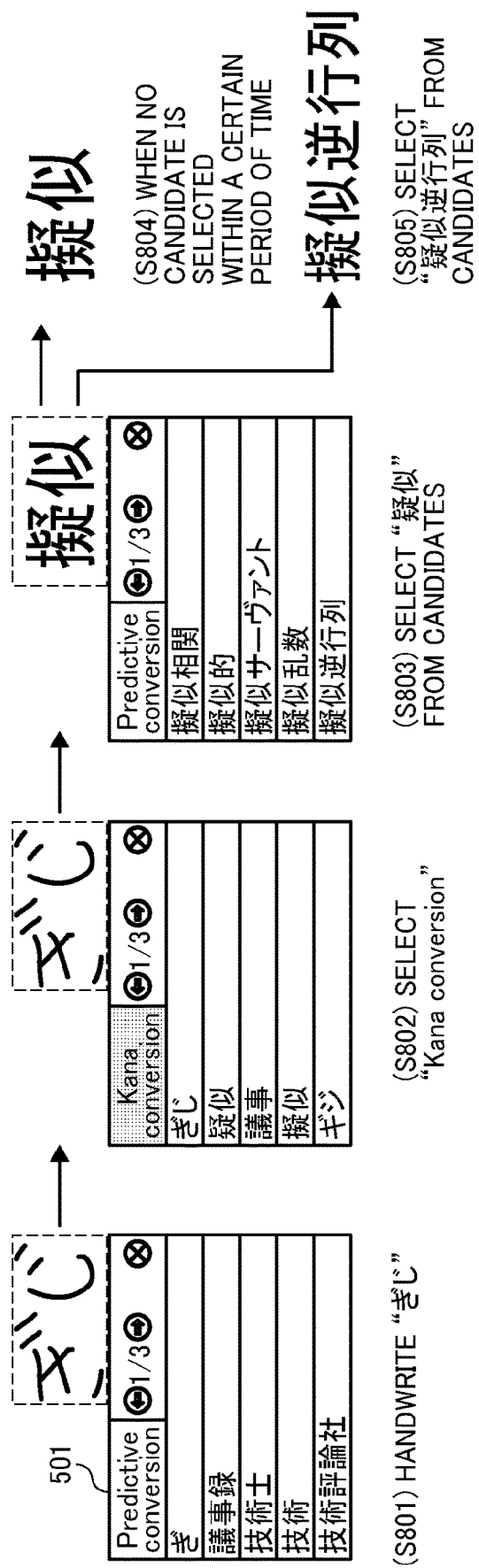
FIG. 16 is a diagram illustrating an operation example of predictive conversion and kana conversion, according to an embodiment of the present disclosure.

FIG. 16 is a diagram illustrating an operation example of predictive conversion and kana conversion. More specifically, FIG. 16 illustrates an example in which character string candidates are displayed by using the dictionary data illustrated in FIG. 14A, FIG. 14B and FIG. 14C.

(S801) is a display example of the character string candidates that are displayed when "ぎじ" (Japanese hiragana character string, pronounced as "giji") is handwritten. (S801) is the same display as (S703).

(S802) is a display example of the character string candidates that are displayed when a mode is switched from a predictive conversion mode to a kana conversion mode in response to a user's operation of pressing the operation unit 501 for switching on the display of (S801). In the kana conversion mode, only language character string candidates are displayed in descending order of selection probability. The kana conversion mode enables to display language character string candidates, which are linguistically probable, independently from the conversion character string candidates and the predictive character string candidates. In this example, "ぎじ" (Japanese hiragana character string, pronounced as "giji"), which is a result of handwriting recognition execution, is arranged as the first candidate of the character string candidates. As the second and subsequent candidates of the character string candidates, the post-conversion character strings in the records indicated by the reference numeral 606 included in the handwriting recognition dictionary data 601 are arranged in descending order of "probability". The post-conversion character strings in the records indicated by the reference numeral 606 are a result of searching executed by the handwriting recognition dictionary unit 27 using "ぎじ" as a search key. As a result, the character string candidate display as illustrated in (S802) is displayed.

(S803) illustrates an example in which the character string candidates are displayed in a case where "擬似" (Japanese kanji character string, meaning "pseudo", and pronounced as "giji") is selected on the display of (S802). In this example, since the handwritten "ぎじ" (Japanese hiragana character string, pronounced as "giji") is converted to "擬似" (Japanese kanji character string, meaning "pseudo", and pronounced as "giji"), the handwritten object "ぎじ" is replaced with the display of the character string object "擬似". In other words, the display of the handwritten object and the rectangular area is erased, "擬似" is displayed in a font of the predicted character size 405 of the predefined control data illustrated in FIG. 12, and the character string object rectangular area is displayed. Next, when the character string conversion dictionary unit 30 and the predictive conversion dictionary unit 32 respectively search the character string conversion dictionary data 602 and the predictive conversion dictionary data 603 by using the character string "擬似" as a search key, the post-conversion character strings in the records indicated by the reference numeral 610 and the post-conversion character strings in the records indicated by the reference numeral 614 are retrieved. Next, when the predictive conversion dictionary unit 32 searches the character string conversion dictionary data 602 by using the post-conversion character strings in the records indicated by the reference numeral 610 included in the character string conversion dictionary data 602, nothing is retrieved. In other words, there is no predictive character string candidate corresponding to the conversion character string candidate. In the present embodiment, the handwriting recognition character string is arranged as the first candidate of the character string candidates. However, in this example, the handwritten character string is not arranged because the conversion to "擬似" has been already performed. Accordingly, the post-conversion character strings in the records indicated by the reference numeral 610 included in the character string conversion dictionary data 602 and the post conversion character strings in the records indicated by the reference numeral 614 included in the predictive conversion dictionary data 603 are arranged as the first and subsequent candidates of the character string candidates in descending order of "probability". As a result, the character string candidate display as illustrated in (S803) is displayed.

(S804) is a display example that is displayed in a case where no character string candidate is selected within a predetermined time (for example, 5 seconds in the example of the character string candidate deletion timer 402 of FIG. 12) from (S803). More specifically, in the example illustrated in (S804), the display of the handwritten object rectangular area is erased, and only the display of the character string object remains. Further, also when a user presses the "X" icon on the display of (S803), (S804) is displayed.

(S805) is a display example that is displayed in a case where "擬似逆行列" (Japanese kanji character string, meaning "pseudo inverse matrix", and pronounced as "giji-gyakkoretsu") as one of the character string candidates is selected on the display of (S803). More specifically, in the example illustrated in (S805), the character string object "擬似" (Japanese kanji character string, meaning "pseudo", and pronounced as "giji") is replaced with "擬似逆行列" (Japanese kanji character string, meaning "pseudo inverse matrix", and pronounced as "giji-gyakkoretsu"), and the display of the character string object rectangular area is erased.

(Example of Newly Generating Handwritten Object)

FIG. 17A and FIG. 17B are illustrations for describing an example of how a handwritten object is newly generated. In FIG. 17A, "ぎ", (Japanese hiragana character, pronounced as "gi") "し" (Japanese hiragana character, pronounced as "shi") and "じ" (Japanese hiragana character, pronounced as "ji") each indicates a handwriting, a dashed line frame indicates a handwritten object rectangular area 911a, and a solid line frame indicates a handwritten object vicinity rectangular area 921a. A handwritten object vicinity rectangular area is calculated as described above with reference to FIG. 12, by using the predefined control data (the handwritten object vicinity rectangular area 403, in particular).

(S901), (S902), and (S903) illustrate examples in which "じ" (Japanese hiragana character, pronounced as "ji") is added inside the handwritten object vicinity rectangular area 921a of "ぎ" (Japanese hiragana character, pronounced as "gi"). More specifically, (S901) illustrates an example in which "し" (Japanese hiragana character, pronounced as "shi") is added inside the handwritten object vicinity rectangular area 921a of "ぎ" (Japanese hiragana character, pronounced as "gi"). (S902) illustrates an example in which the handwritten object "ぎ" (Japanese hiragana character, pronounced as "gi") and the handwritten object "し" (Japanese hiragana character, pronounced as "shi") are merged, and an enlarged handwritten object rectangular area 911b is displayed. Further, in the example of (S902), an enlarged handwritten object vicinity rectangular area 921b is also displayed, and a voice sound symbol is added.

(S903) illustrates an example in which the handwritten object "ぎし" (Japanese hiragana character string, pronounced as "gishi") and the voice sound symbol are merged, and thereby an enlarged handwritten object rectangular area 911c is displayed. In a case where a user does not perform any pen operation while (S903) is displayed, a character string candidate "ぎじ" (Japanese hiragana character string, pronounced as "giji") is displayed. As described above, when a stroke is added inside the handwritten object vicinity rectangular area, the stroke is added to the same handwritten object, and the character string candidate is displayed based on the handwritten object to which the stroke is added.

In FIG. 17B, (S904), (S905), and (S906) illustrate examples in which "し" (Japanese hiragana character, pronounced as "ji") is added outside the handwritten object vicinity rectangular area 921a of "ぎ" (Japanese hiragana character, pronounced as "gi"). More specifically, (S904) illustrates an example in which "し" (Japanese hiragana character, pronounced as "shi") is added outside the handwritten object vicinity rectangular area 921a of "ぎ" (Japanese hiragana character, pronounced as "gi"). (S905) illustrates an example in which a handwritten object rectangular area 912a is newly generated for "し" (Japanese hiragana character, pronounced as "shi"), and the voice sound symbol is added inside a handwritten object vicinity rectangular area 922a of "し". (S906) illustrates an example in which the handwritten object rectangular area 912a of "し" is enlarged, and thereby a handwritten object rectangular area 912b of "じ" (Japanese hiragana character, pronounced as "ji") is displayed. In a case where a user does not perform any pen operation while (S906) is displayed, a character string candidate "じ" is displayed. As described above, when a stroke is added outside the handwritten object vicinity rectangular area 921a, the stroke is added to the handwritten object rectangular area 912a that is newly generated, and the character string candidate is displayed based on the newly-generated handwritten object.

(Example of Automatic Identification of Character Size)

Figure 18A:
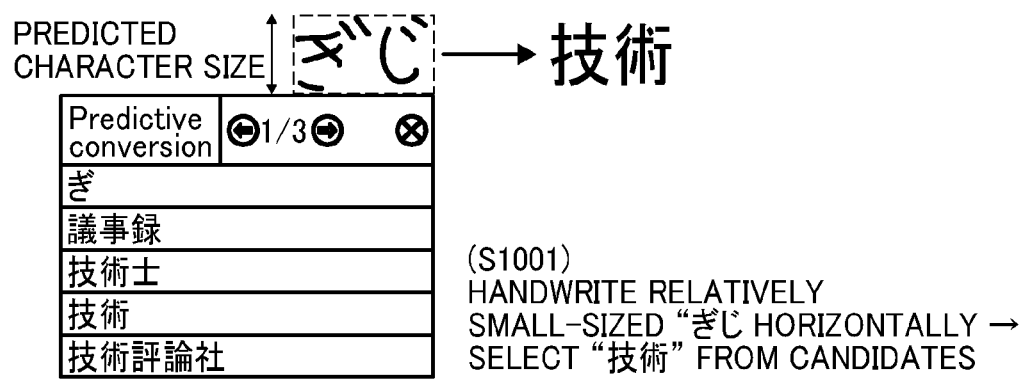
FIG. 18A, FIG. 18B and FIG. 18C are diagrams illustrating examples of automatic identification of a horizontal writing character size, according to an embodiment of the present disclosure.
Figure 18B:
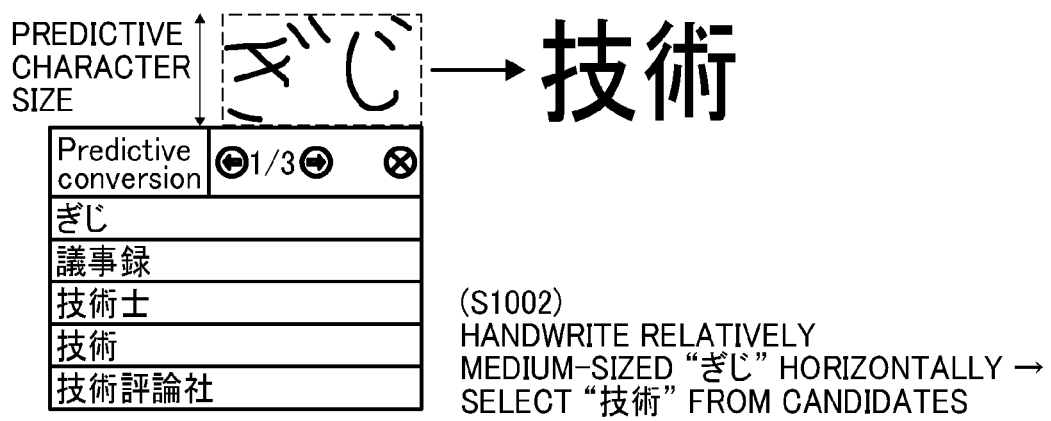
Figure 18C:
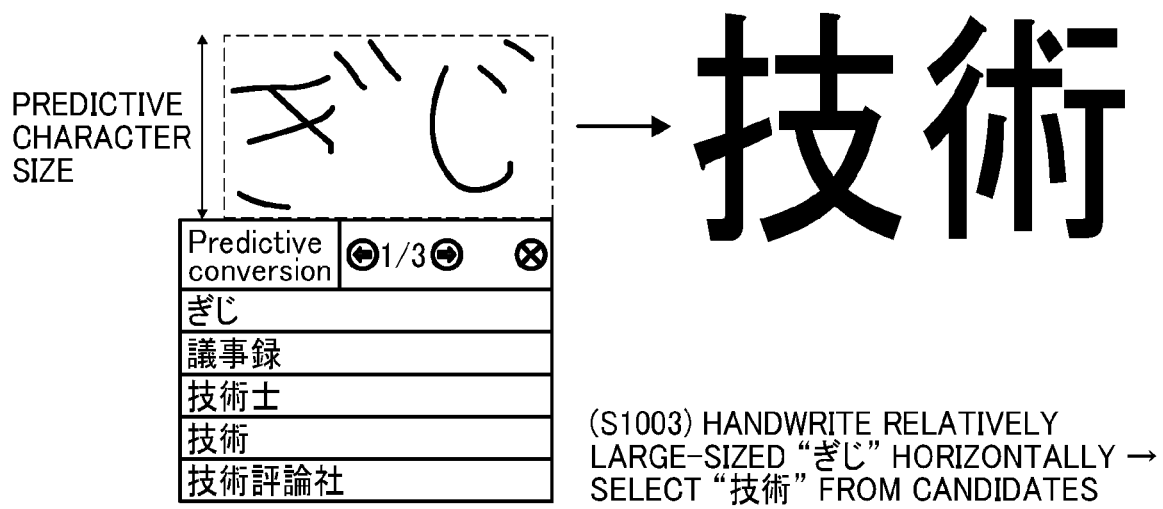

FIG. 18A, FIG. 18B and FIG. 18C are diagrams illustrating examples of automatic identification of a horizontal writing character size. The predicted character size and the font are calculated based on a handwritten object as described above with reference to FIG. 12, by using the predefined control data (the predicted character size 405, in particular).

In FIG. 18A, (S1001) is an example in which "技術" (Japanese kanji character string, meaning "technology" and pronounced as "gijutsu") is selected from the character string candidates for the handwritten object "ぎじ" (Japanese hiragana character string, pronounced as "giji") of which size is small, and a character string object of "技術" is displayed in a relatively small-sized font from the upper left coordinates of the handwritten object rectangular area 1011a. In FIG. 18B, (S1002) is an example in which "技術" is selected from the character string candidates for the handwritten object "ぎじ" of which size is medium, and a character string object of "技術" is displayed in a relatively medium-sized font. In FIG. 18C, (S1003) is an example in which "技術" is selected from the character string candidates for the handwritten object "ぎじ" of which size is large, and a character string object of "技術" is displayed in a relatively large-sized font.

In the example of the predicted character size 405 illustrated in FIG. 12, since one of the small-sized, medium-sized, and large-sized fonts is used for a handwritten object of any sizes, the displayed character string object does not always fit in the handwritten object rectangular area.

Figure 19A:
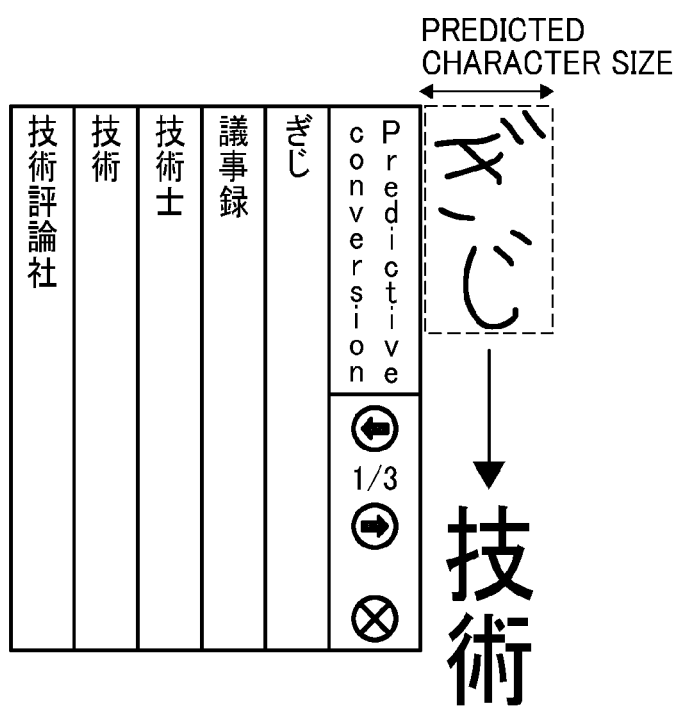
FIG. 19A, FIG. 19B and FIG. 19C are diagrams illustrating examples of automatic identification of a vertical writing character size, according to an embodiment of the present disclosure.
Figure 19B:
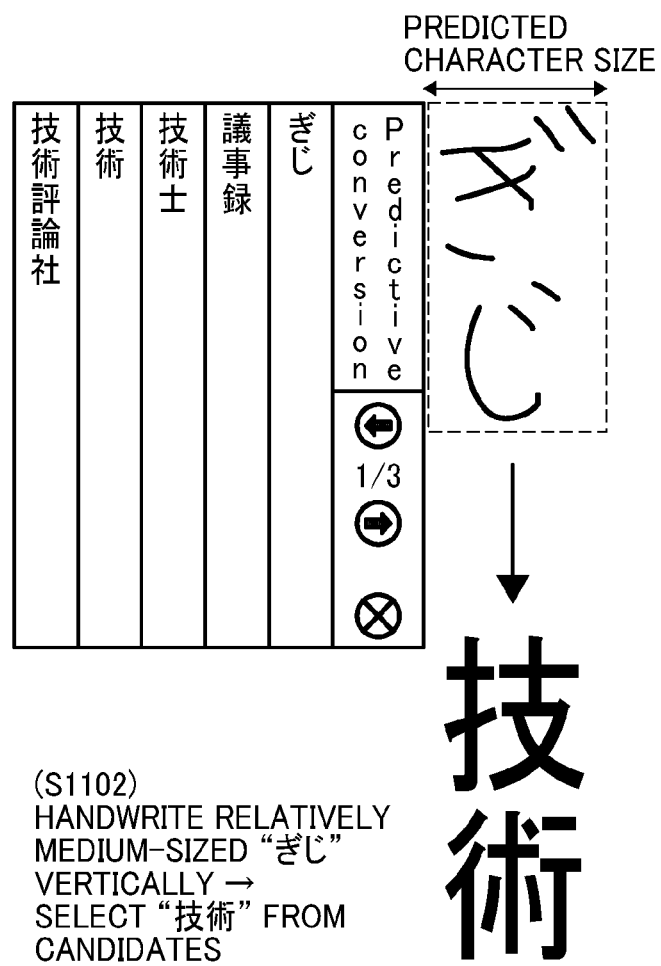
Figure 19C:
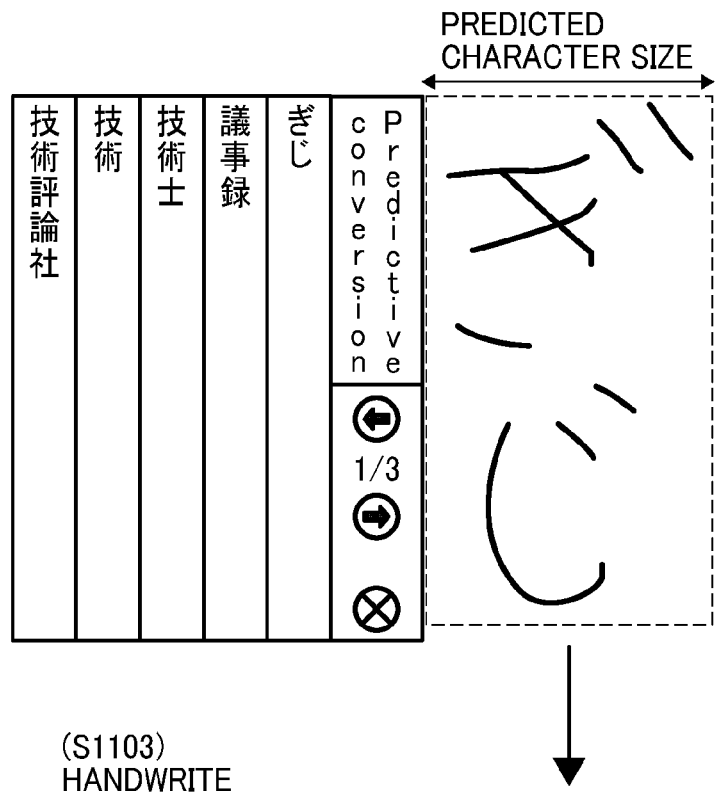

FIG. 19A, FIG. 19B and FIG. 19C are diagrams illustrating examples of automatic identification of a vertical writing character size. In FIG. 19A, (S1101) is an example in which "技術" is selected from the character string candidates for the handwritten object "ぎじ" (Japanese hiragana character string, pronounced as "giji") of which size is small, and a character string object of "技術" (Japanese kanji character string, meaning "technology" and pronounced as "gijutsu") is displayed in a relatively small-sized font. In FIG. 19B, (S1102) is an example in which "技術" is selected from the character string candidates for the handwritten object "ぎじ" of which size is medium, and a character string object of "技術" is displayed in a relatively medium-sized font. In FIG. 19C, (S1103) is an example in which "技 術" is selected from the character string candidates for the handwritten object "ぎじ" of which size is large, and a character string object of "技術" is displayed in a relatively large-sized font.

(Example of Display Position of Character String Candidate Display)

FIG. 20A, FIG. 20B, FIG. 20C and FIG. 20D are diagrams illustrating examples of a display position of a character string candidate display area. The predicted writing direction is calculated based on a handwritten object in the display examples of the character string candidate display area illustrated in FIG. 20A, FIG. 20B, FIG. 20C and FIG. 20D as described above with reference to FIG. 12, by using the predefined control data (the predicted writing direction/character size determination conditions 404, in particular).

Figure 20A:
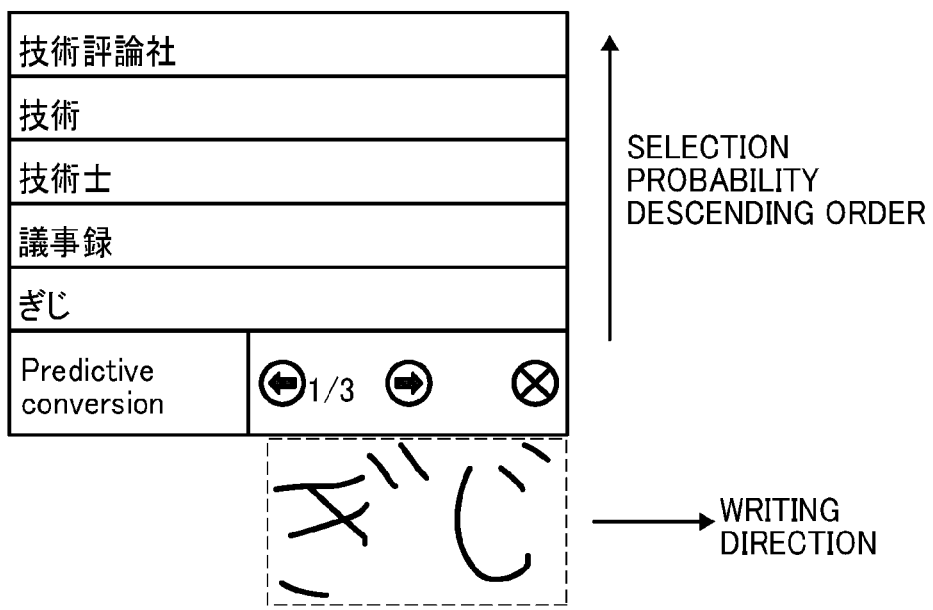
FIG. 20A, FIG. 20B, FIG. 20C and FIG. 20D are diagrams illustrating examples of a display position of a character string candidate display area, according to an embodiment of the present disclosure.

In FIG. 20A, (S1201) is an example of a character string candidate display that is displayed when characters are handwritten in an area other than an upper part of a screen and the predicted writing direction is the horizontal writing direction. When a user handwrites characters in horizontal writing, an area below the handwriting position may be hidden by the user's arm. Further, the subsequent lines are added below the current line. Accordingly, to prevent the character string candidates from being displayed below the current handwriting position, the character string candidates are displayed above the current handwriting position. The character string candidates are displayed in descending order of selection probability from bottom to top in order to allow the user to select a character string that is close to the handwriting position.

Figure 20B:
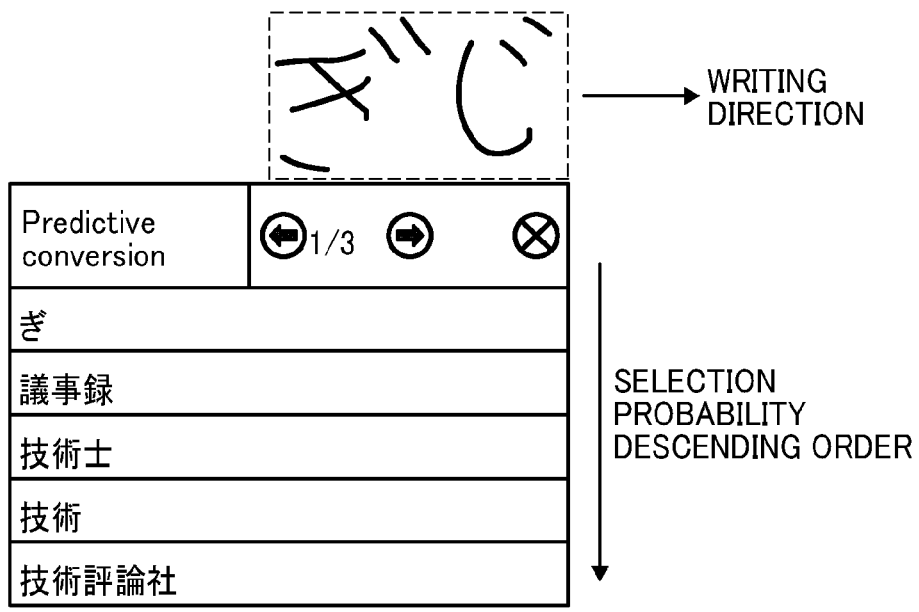

In FIG. 20B, (S1202) is an example of a character string candidate display that is displayed when characters are handwritten in the vicinity of an upper area of a screen and the predicted writing direction is the horizontal writing direction. In the vicinity of the upper area of the screen, there is no room above the handwriting position. For this reason, the character string candidates are displayed below the current writing position. Accordingly, the character string candidates are displayed from top to bottom in descending order of selection probability.

Figure 20C:
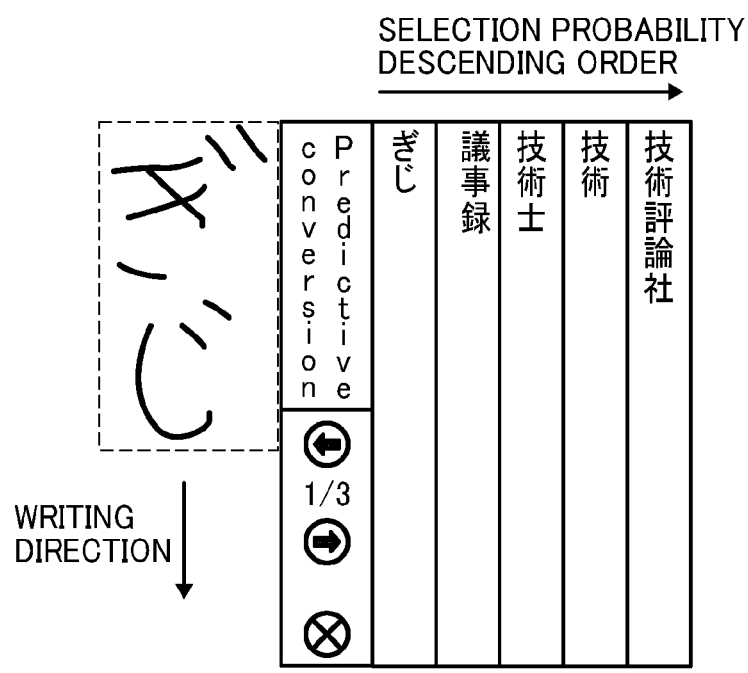

In FIG. 20C, (S1203) is an example of a character string candidate display that is displayed when characters are handwritten in an area other than a right part of a screen and the predicted writing direction is the vertical writing direction. When a user handwrites characters in vertical writing, the subsequent lines are added to the right of the current line. Accordingly, to prevent the character string candidates from being displayed to the right of the current handwriting position, the character string candidates are displayed to the left of the current handwriting position. The character string candidates are displayed in descending order of selection probability from left to right in order to allow the user to select a character string that is close to the handwriting position.

Figure 20D:
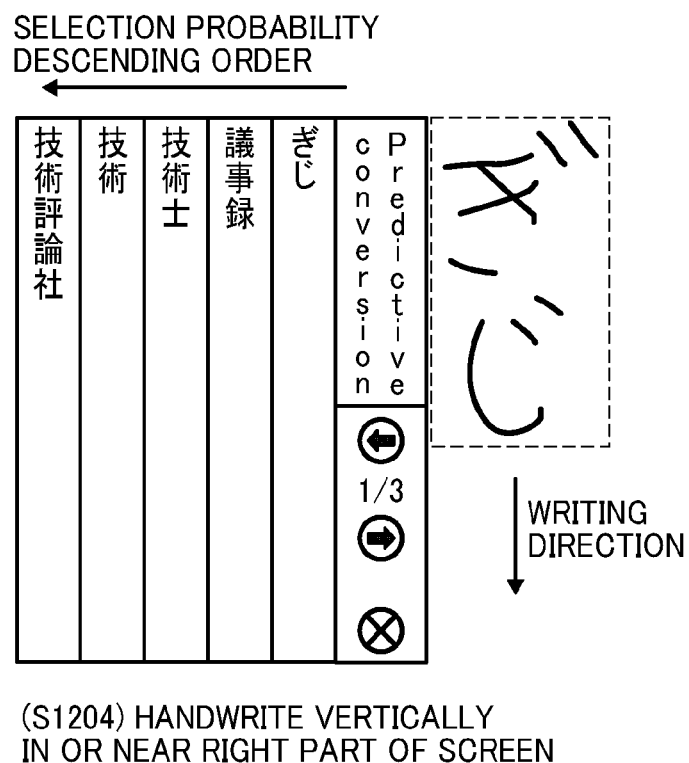
Figure 22A:
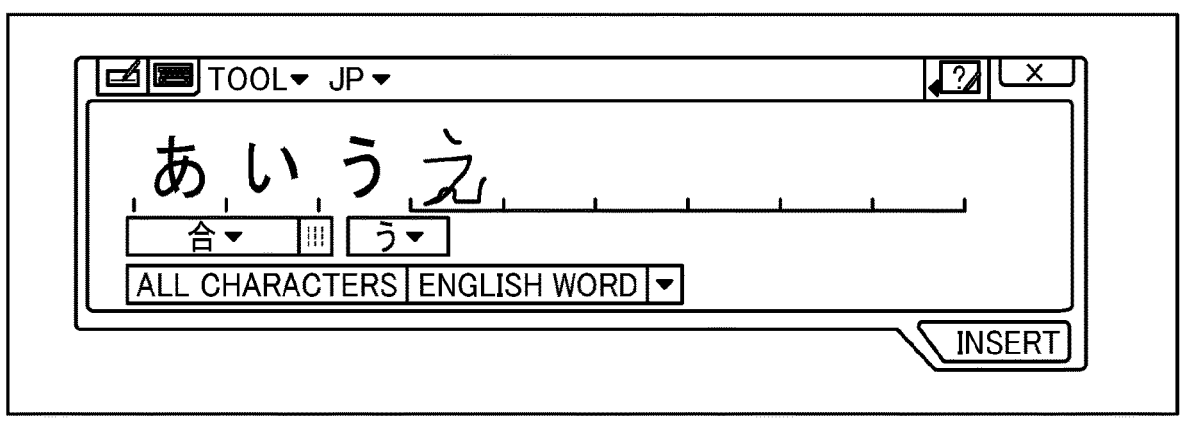
FIG. 22A and FIG. 22B are diagrams illustrating examples of a handwriting input screen, according to the related art.
Figure 22B:
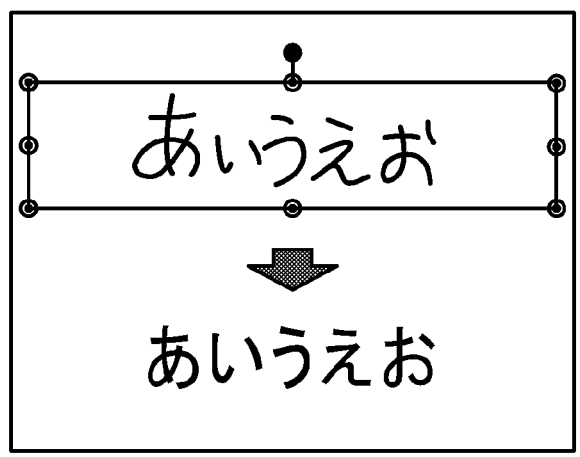

In FIG. 20D, (S1204) is an example of a character string candidate display that is displayed when characters are handwritten in the vicinity of a right part of a screen and the predicted writing direction is the vertical writing direction. In the vicinity of the right part of the screen, there is no room to the right of the handwriting position. For this reason, the character string candidates are displayed to the left of the current writing position. Accordingly, the character string candidates are displayed from right to left in descending order of selection probability.

(Example of Editing Operation of Handwritten Object)

FIG. 21 is a diagram illustrating an example of an editing operation of a handwritten object.

(S1301) is a display example of an edit box that is displayed when a handwritten object "ぎ し" (Japanese hiragana character string, pronounced as "gishi") is selected. In this example, the handwritten object is selected in response to a user's operation of long-pressing the handwritten object, and thereby an edit box 1311 is displayed. The edit box 1311 includes a dashed line frame representing the handwritten object rectangular area, and eight squares used for operation. Four squares from among the eight squares are displayed respectively at the four corners of the handwritten object rectangular area. The other four squares are displayed respectively at the centers of four sides of the handwritten object rectangular area. When the user moves the electronic pen 2500 while the electronic pen 2500 is in contact with the dashed line (such user's operation is referred to as "drag" hereinafter), the handwritten object is moved in the direction of movement of the electronic pen 2500. When the user drags any one of the squares with the electronic pen 2500, the handwritten object is deformed in the direction of movement of the electronic pen 2500. When the user drags a position just outside any one of the squares, the handwritten object is rotated.

(S1302) is a display example that is displayed when a user brings the electronic pen 2500 into contact with "し" (Japanese hiragana character, pronounced as "shi"), which a part of the handwritten object illustrated in (S1301), and thereafter moves the electronic pen 2500 in a zigzag manner up and down. In this example, such user's operation of moving the electronic pen 2500 in a zigzag manner up and down is detected an operation for erasing.

(S1303) is a display example that is displayed when the stroke of "し" is erased from the display of (S1302). Since a change occurs in the handwritten object, character string candidates for "ぎ" (Japanese hiragana character, pronounces as "gi") are displayed.

(S1304) is a display example that is displayed when the voice sound symbol of "し" is added to the handwritten object illustrated in (S1301). Since a change occurs in the handwritten object, character string candidates for "ぎじ" (Japanese hiragana character string, pronounces as "giji") are displayed.

<Effect of Embodiment>

As described heretofore, the handwriting input apparatus 2 according to an embodiment of the present disclosure is a handwriting input display apparatus for displaying, on the display 220 (an example of display means), a stroke generated by an input to a screen of the display 220 using the electronic pen 2500 (an example of input means), as the handwritten object 504. The handwriting input apparatus 2 includes the handwriting input display controller 23 (an example of display control means) configured to cause the display 220 to display character string candidates 509 including the handwriting recognition character string candidate 506 (an example of a handwriting recognition candidate), which is obtained by recognizing the handwritten object 504 as a character string, when the handwritten object 504 does not change for a predetermined time period. When the handwriting recognition character string candidate 506 is selected, the handwriting input display controller 23 erases the display of the character string candidates 509 and the display of the handwritten object 504, and displays a character string object, which is a character string indicated by the selected handwriting recognition character string candidate 506, at a position where the erased handwritten object 504 was displayed. When the handwriting recognition character string candidate 506 is not selected for a predetermined time period and the display of the character string candidate 509 is erased, the handwriting input display controller 23 causes the handwritten object 504 to be kept displayed. Thus, the handwriting input apparatus 2 does not necessarily require a user to select the handwriting recognition candidate, allowing the user to freely select one of handwriting and a character string as needed according to the content or the speed of the discussion.

Further, in the handwriting input apparatus 2 (an example of the handwriting input display apparatus) according to an embodiment of the present disclosure, The handwriting input display controller 23 (an example of the display control means) causes the display 220 (an example of the display means) to display the character string candidates 509 including a language character string candidate (an example of a recognition conversion candidate), which is another character string converted from the handwriting recognition character string candidate 506 (an example of the handwriting recognition candidate). When the language character string candidate is selected, the handwriting input display controller 23 erases the display of the character string candidates 509 and the display of the handwritten object 504, and displays a character string object, which is a character string indicated by the selected language character string candidate, at a position where the erased handwritten object 504 was displayed. When the language character string candidate is not selected for a predetermined time period and the display of the character string candidate 509 is erased, the handwriting input display controller 23 causes the handwritten object 504 to be kept displayed. Thus, since the handwriting input apparatus 2 can convert the handwriting recognition result into another character string that bears no relevance linguistically, the handwriting input apparatus 2 can convert the handwritten object to an abbreviation that is specific to a user's worksite or a business term.

Furthermore, in the handwriting input apparatus 2 (an example of the handwriting input display apparatus) according to an embodiment of the present disclosure, The handwriting input display controller 23 (an example of the display control means) causes the display 220 (an example of the display means) to display the character string candidates 509 including the conversion character string candidates 507 (an example of a recognition prediction candidate), which is predictively converted from the handwriting recognition character string candidate 506 (an example of the handwriting recognition candidate). When one of the conversion character string candidates 507 is selected, the handwriting input display controller 23 erases the display of the character string candidates 509 and the display of the handwritten object 504, and displays a character string object, which is a character string indicated by the selected one of the conversion character string candidates 507, at a position where the erased handwritten object 504 was displayed. When any one of the conversion character string candidates 507 is not selected for a predetermined time period and the display of the character string candidates 509 is erased, the handwriting input display controller 23 causes the handwritten object 504 to be kept displayed. Thus, since the handwriting input apparatus 2 can perform conversion into a long character string starting from a character string as a handwriting recognition result, the time taken for inputting such long character string can be shortened significantly.

Still further, in the handwriting input apparatus 2 (an example of the handwriting input display apparatus) according to an embodiment of the present disclosure, The handwriting input display controller 23 (an example of the display control means) causes the display 220 (an example of the display means) to display the character string candidates 509 including a character string/predictive conversion candidate (an example of a conversion prediction candidate), which is predictively converted from the conversion character string candidates 507 (an example of the recognition prediction candidate). When the character string/predictive conversion candidate is selected, the handwriting input display controller 23 erases the display of the character string candidates 509 and the display of the handwritten object 504, and displays a character string object, which is a character string indicated by the selected character string/predictive conversion candidate, at a position where the erased handwritten object 504 was displayed. When the character string/predictive conversion candidate is not selected and the display of the character string candidate 509 is erased, the handwriting input display controller 23 causes the handwritten object 504 to be kept displayed. Thus, since the handwriting input apparatus 2 can perform conversion into a long character string starting from another character string that bears no relevance linguistically, the time taken for inputting such long character string starting from an abbreviation that is specific to a user's worksite or a business term can be shortened significantly.

The above embodiment also discloses inventions of aspects as described below.

Appendix 1

In the above-described background art, a handwritten object in an input frame is recognized as a character, and the recognized character is input at the current cursor position. Further, in the above-described background art, the handwriting area is selected later to convert the handwriting to characters, and the handwriting in the input frame is converted to characters by selecting a clear copy mode. However, in any of the above cases, a special procedure for inputting a character string is to be performed. When a desired character string is not recognized, a more complicated procedure is to be performed for recognition of the desired character string. Alternatively, a user gives up the recognition of the character string and switches to the handwriting input mode to input handwritten characters as they are.

Although the recognition rate of handwritten characters by computers has been improving, there still often occurs a case in which characters handwritten by a person that are difficult read are not recognized. Accordingly, the above-mentioned complicated procedures and mode switching may occur frequently. When the purpose is clean writing, it does not matter if time is spent on such complicated procedures and mode switching. However, when the purpose is communication, such as when a plurality of users make discussions gathering around a handwriting input board, the users have little time for such complicated procedures or mode switching.

The present disclosure was made in view of the above-described issues. A method is provided that automatically displays recommendable handwriting recognition candidates without reducing the speed of handwriting input, allows a user to select a character string from the handwriting recognition candidates as needed, converts to the selected character string, and if not necessary, allows the user to ignore the handwriting recognition candidates and continue the handwriting input.

Appendix 1 is a handwriting input display apparatus (e.g., the handwriting input apparatus 2) that stores data acquired from the handwriting input unit 21 configured to send, at regular intervals, a notification indicating an input means down state (e.g., the pen-down state) in which input means for handwriting detected as being in contact with a handwriting surface, an input means up state (e.g., the pen-up state) in which the input means is detected as being apart from the handwriting surface, and input coordinates (e.g., pen coordinates) indicating a position where the input means is in contact with the handwriting surface, and that processes the acquired data to display the processed data on a display device (e.g., the display 220), wherein the handwriting input display apparatus is configured to:

display, on the display device, a stroke relating to a straight line or a curved line, which is obtained by interpolating coordinates between the input coordinates notified at regular intervals during a time period from the input means down state to the input means up state notified from the handwriting input unit 21;

when, within a predetermined time period (e.g., five seconds) from when a handwritten object is changed due to a change of one or more strokes, a new change does not occur in the handwritten object, display a result obtained by recognizing the handwritten object as a character string as a plurality of handwriting recognition character string candidates 506 (an example of handwriting recognition candidates);

when one of the handwriting recognition character string candidates 506 is selected, erase the display of the handwriting recognition character string candidates 506 and the display of the handwritten object, and display a character string object, which is a character string of the selected one of the handwriting recognition character string candidates 506, at a position where the erased handwritten object was displayed;

when any one of the handwriting recognition character string candidates 506 is not selected for the predetermined time period, when a selection is made for erasing the display of the handwriting recognition character string candidates 506, or when a change of the handwritten object occurs, erase the display of the handwriting recognition character string candidates 506; and when the display of the handwriting recognition character string candidates 506 is erased under the condition other than one of the handwriting recognition character string candidates 506 is selected, cause the handwritten object to be kept displayed.

Thus, the handwriting input display apparatus does not necessarily require a user to select the handwriting recognition candidate, allowing the user to freely select one of handwriting and a character string as needed according to the content or the speed of the discussion.

Appendix 2

In the above Appendix 1, a handwritten character string is converted into a print character string that is probable linguistically. However, depending on the type of business, organizational structure of the company, and the contents to be discussed, conversion to a character string other than a linguistic conversion is sometimes required, such as conversion to an abbreviation that is specific to a user's worksite or a business term. To address this issue, a method is provided which can convert each handwriting recognition candidate into another character string.

Appendix 2 is the handwriting input display apparatus (e.g., the handwriting input apparatus 2) according to Appendix 1,
wherein the handwriting input display apparatus is configured to:
display a result obtained by converting each of the handwriting recognition character string candidates 506 (an example of a handwriting recognition candidate) into another character string as a plurality of language character string candidates (an example of a recognition conversion candidate);
when one of the language character string candidates is selected, erase the display of the character string candidates 509 (an example of a handwriting recognition conversion candidate) as the handwriting recognition character string candidates 506 and the language character string candidates and the display of the handwritten object, and display a character string object having the selected language character string candidate as a character string at the same position where the erased handwritten object was displayed;
when any one of the character string candidates 509 is not selected for the predetermined time period (e.g., 5 seconds), when a selection is made for erasing the character string candidates 509, or when a change of the handwritten object occurs, erase the display of the character string candidates 509; and
when the display of the character string candidates 509 is erased under the condition other than one of the character string candidates 509 is selected, cause the handwritten object to be kept displayed.

Thus, since the handwriting recognition result is converted into another character string that bears no relevance linguistically, the handwritten object is converted to an abbreviation that is specific to a user's worksite or a business term.

Appendix 3

In the above Appendix 2, a user has to input a handwritten character string up to the end even if it is a long character string frequently used in the user's worksite. To address this issue, a method is provided that allows a user to select one of character string candidates predicted from each handwritten character string and converts the selected character string candidate into a print character string.

Appendix 3 is the handwriting input display apparatus (e.g., the handwriting input apparatus 2) according to Appendix 2,
wherein the handwriting input display apparatus is configured to:
display character strings that can be predicted based on the handwriting recognition character string candidates 506 (an example of the handwriting recognition candidate) as a plurality of conversion character string candidates 507 (an example of a recognition prediction candidate);
when one of the conversion character string candidates 507 is selected, erase the display of the character string candidates 509 (an example of a handwriting recognition prediction candidate) as the handwriting recognition character string candidates 506 and the conversion character string candidates 507 and the display of the handwritten object, and display a character string object having the selected one of the conversion character string candidates 507 as a character string at the same position where the erased handwritten object was displayed;
when any one of the character string candidates 509 is not selected for the predetermined time period (e.g., 5 seconds), when a selection is made for erasing the character string candidates 509, or when a change of the handwritten object occurs, erase the display of the character string candidates 509; and
when the display of the character string candidates 509 is erased under the condition other than one of the character string candidates 509 is selected, cause the handwritten object to be kept displayed.

Thus, since conversion into a long character string starting from a character string as a handwriting recognition result is performed, the time taken for inputting such long character string can be shortened significantly.

Appendix 4

In the above Appendix 3, a handwritten character string is converted into a character string that is predictable based on a print character string that is probable linguistically. For example, a handwritten character string is not converted to a character string that is predictable based on an abbreviation that is specific to a user's worksite or a business term. To address this issue, a method is provided which can convert each handwriting recognition candidate into another character string and convert the another character string into a character string predicted from the another character string.

Appendix 4 is the handwriting input display apparatus (e.g., the handwriting input apparatus 2) according to Appendix 3,
wherein the handwriting input display apparatus is configured to:
display long character strings that respectively include the language character string candidates (an example of the recognition conversion candidate) as a plurality of character string/predictive conversion candidates 508 (an example of the conversion prediction candidate);
when one of the character string/predictive conversion candidates 508 is selected, erase the display of the character string candidates 509 (an example of handwriting recognition conversion prediction candidate) as the handwriting recognition character string candidates 506 (an example of the handwriting recognition candidate), the language character string candidate, and the character string/predictive conversion candidates 508, erase the display of the handwritten object, and display a character string object having the selected one of the character string/predictive conversion candidates 508 as a character string at the same position where the erased handwritten object was displayed;

when any one of the character string candidates 509 is not selected for the predetermined time period (e.g., 5 seconds), when a selection is made for erasing the character string candidates 509, or when a change of the handwritten object occurs, erase the display of the character string candidates 509; and when the display of the character string candidates 509 is erased under the condition other than one of the character string candidates 509 is selected, cause the handwritten object to be kept displayed.

Thus, since conversion into a long character string starting from another character string that bears no relevance linguistically is performed, the time taken for inputting such long character string starting from an abbreviation that is specific to a user's worksite or a business term can be shortened significantly.

Appendix 5

In the above Appendix 1 to Appendix 4, select is made as to whether to convert one handwritten object into a character string object. However, in a case where an apparatus having a large handwriting input area such as a whiteboard is used, a plurality of handwritten objects and a plurality of character string objects may be required. To address this issue, a method is provided which can generate a new handwritten object when the distance between the current handwritten object and a stroke to be added is long.

Appendix 5 is the handwriting input display apparatus (e.g., the handwriting input apparatus 2) according to Appendix 4,
wherein the handwriting input display apparatus is configured to: when a next stroke is to be added to a handwritten object and when a handwritten object vicinity rectangular area and a stroke rectangular area overlap each other, the handwritten object vicinity rectangular area being a rectangular area obtained by enlarging a handwritten object rectangular area as a minimum rectangular area including each stroke of a current handwritten object, which is a handwritten object including a stroke that is added last, by a predetermined distance in a vertical direction and a horizontal direction (e.g., an area obtained by enlarging the handwritten object rectangular area horizontally by 50% of a predicted character size of Appendix 7 and vertically by 80% of the predicted character size), the stroke rectangular area being a minimum rectangular area including an additional stroke, which is a stroke to be added next, add the additional stroke to the current handwritten object; and when the handwritten object vicinity rectangular area and the stroke rectangular area do not overlap each other, add the additional strokes to a new handwritten object, which is different from the current handwritten object, and erase the display of the character string candidates 509 as the handwriting recognition character string candidates 506 (an example of the handwriting recognition candidate), the language character string candidate (an example of the recognition conversion candidate), the conversion character string candidates 507 (an example of the recognition prediction candidate), or the character string/predictive conversion candidates 508 (an example of the conversion prediction candidate).

Thus, since conversion into a long character string starting from another character string that bears no relevance linguistically is performed, the time taken for inputting such long character string starting from an abbreviation that is specific to a user's worksite or a business term can be shortened significantly.

Appendix 6

In the above Appendix 1 to Appendix 5, when a character string candidate is displayed in a state where a plurality of handwritten objects and character string objects are displayed, it may be difficult to identify a specific handwritten object as a target of handwriting recognition. To address this issue, a method is provided which can change the display of the rectangular area of the handwritten object as a source of character string candidates when the character string candidates are displayed and can cancel the change of the display when the display of the character string candidates is erased.

Appendix 6 is the handwriting input display apparatus (e.g., the handwriting input apparatus 2) according to Appendix 5,
wherein, the handwriting input display apparatus is configured to: when the character string candidates 509 are displayed, change the display of the handwritten object rectangular area and display the changed display of the handwritten object; and when the display of the character string candidates 509 is erased, cancel the change of the display of the handwritten object rectangular area.

Accordingly, even when a plurality of handwritten objects and character string objects are displayed, the display of the handwritten object rectangular area as a source of the character string candidates is changed, when a user selects a character string candidate, the user can intuitively recognize which handwritten object is to be converted to the character string object.

Appendix 7

In the above Appendix 1 to Appendix 4, there is no description about a character size when displaying the character string object. However, in a case where a method is adopted which requires a user to perform an operation of designating (switching) a character size every time the user wants to change the character size, sometimes the switching operation itself may not be acceptable in view of time, when the purpose is communication. To address this issue, a method is provided which can predict a writing direction and a character size based on the handwritten object rectangular area and automatically select from predefined font styles and font sizes.

Appendix 7 is the handwriting input display apparatus (e.g., the handwriting input apparatus 2) according to Appendix 6,
wherein when one of the character string candidates 509 is selected and a character string object having the selected one of the character string candidates 509 as a character string is displayed at the position where the erased handwritten object was displayed, the handwriting input display apparatus is configured to:

when a difference between the time when a stroke is first added in the handwritten object and the time when a stroke is last added is equal to or longer than a predetermined time period (e.g., 10 seconds), and when a difference between a horizontal distance as a distance in the horizontal direction of the handwritten object rectangular area, which is a minimum rectangular area including the handwritten object, and a vertical distance as a distance in the vertical direction of the handwritten object rectangular area is equal to or longer than a predetermined distance (e.g., 10 millimeters), and the horizontal distance is longer than the vertical distance, identify the vertical distance as a predicted character size;

when the horizontal distance is shorter than the vertical distance, identify the horizontal distance as the predicted character size;

compare the predicted character size with predefined font sizes (e.g., the font size (FontSize) defined as the predicted character sizes 405 illustrated in FIG. 12), which are a plurality of types of font sizes that are defined in advance, to automatically select one of the predefined font sizes; and display the character string object with the selected predefined font size of a predefined font style (e.g., a font style (FontStyle) defined as the predicted character size 405 illustrated in FIG. 12), which is a font style defined in advance.

Thus, since the character string object can be displayed by predicting the character size based on the handwritten object rectangular area, the operation of selecting the character size in advance can be omitted, and the character size can be designated intuitively.

Appendix 8: In the above Appendix 5 to Appendix 7, there is no description about a display position of the character string candidates. When the display of the character string candidates overlaps with the handwriting direction, the character string candidates may interfere with the free handwriting. To address this issue, a method is provided which predicts the writing direction of the handwritten object, displays the character string candidates above or below of the handwritten object when the predicted writing direction is the horizontal writing direction, and displays the character string candidates to the left or right of the handwritten object when the predicted writing direction is the vertical writing direction.

Appendix 8 is the handwriting input display apparatus (e.g., the handwriting input apparatus 2) according to any one of Appendix 5 to Appendix 7, wherein the handwriting input display apparatus is configured to:

when a difference between the time when a stroke is first added in the handwritten object and the time when a stroke is last added is equal to or longer than a predetermined time period (e.g., 10 seconds), and when a horizontal distance as a distance in the horizontal direction of the handwritten object rectangular area, which is a minimum rectangular area including the handwritten object, is longer than a vertical distance as a distance in the vertical direction with respect to the horizontal distance, determine that the predicted writing direction is the horizontal writing direction;

when the horizontal distance is shorter than the vertical distance, determine that the predicted writing direction is the vertical writing direction;

when the predicted writing direction is the horizontal writing direction, display the character string candidates 509 above or below the handwritten object rectangular area; and when the predicted writing direction is the vertical writing direction, display the character string candidates 509 to the left or right of the handwritten object rectangular area.

Thus, since the character string candidates can be displayed out of the predicted writing direction of the handwritten object, allowing a user to continue handwriting and select one of the character string candidates as needed.

Appendix 9

In the above Appendix 8, there is no description about a display order of the plurality of character string candidates. Sometimes an operation of selecting one of the character string candidates may not be acceptable in view of time, when the purpose is communication. To address this issue, a method is provided which can arrange the most probable character string candidate at a position closest to the handwritten object.

Appendix 9 is the handwriting input display apparatus (e.g., the handwriting input apparatus 2) according to Appendix 8, wherein the handwriting input display apparatus is configured to:

when the character string candidates 509 are displayed above the handwritten object rectangular area, display the character string candidates from bottom to top in a selection probability descending order, which is a descending order of probability with which each of the character string candidates 509 is selected;

when the character string candidates 509 are displayed below the handwritten object rectangular area, display the character string candidates from top to bottom in the selection probability descending order;

when the character string candidates 509 are displayed to the right of the handwritten object rectangular area, display the character string candidates 509 side by side from left to right in the selection probability descending order; and when the character string candidates 509 are displayed to the left of the handwritten object rectangular area, display the character string candidates 509 side by side from right to left in the selection probability descending order.

Thus, since the selection probability of the character string candidate that is displayed closest to the handwritten object in the predicted writing direction is high, the probability that the character string candidate can be selected by an operation close to handwriting from the position at which handwriting is performed is increased.

Appendix 10

In the above Appendix 8 and Appendix 9, there is no description about a writing direction of the character string candidates. When the purpose is communication, there are cases where it is desirable to determine the character string candidates in a short time. To address this issue, a method is provided that predicts a writing direction of the handwritten object and displays the character string candidates in the same direction as the predicted writing direction to allow a user to imagine how the character string is displayed after selecting one of the character string candidates.

Appendix 10 is the handwriting input display apparatus (e.g., the handwriting input apparatus 2) according to Appendix 8 or Appendix 9,
wherein the handwriting input display apparatus is configured to:
when the character string candidates 509 are displayed above or below the handwritten object rectangular area, display the character string candidates 509 in horizontal writing; and
when the character string candidates 509 are displayed to the right of or to the left of the handwritten object rectangular area, display the character string candidates 509 in vertical writing.

Thus, since the character string candidates are displayed in the same direction as the predicted writing direction of the handwritten object, a user can intuitively recognize what kind of character string object will be displayed based on the handwritten object in response to selecting one of the character string candidates.

Appendix 11

In the above [Appendix 1] to [Appendix 4], there is no description about the method of changing an already-written handwritten object and display a character string object. To address this issue, a method is provided which edits an already-written handwritten object and display character string candidates.

Appendix 11 is the handwriting input display apparatus (e.g., the handwriting input apparatus 2) according to any one of Appendix 5 to Appendix 10,
wherein the handwriting input display apparatus is configured to:
select a handwritten object;
delete, move, deform or divide the selected handwritten object;
add a stroke to the selected handwritten object;
delete, move, deform or divide a stroke in the selected handwritten object; and
when the addition of the stroke to the handwritten object, or the deletion, movement, deformation, or division of the stroke in the handwritten object occurs, display the character string candidates 509.

Thus, since the handwritten object can be edited later, the handwritten object can be selectively rearranged later, and can be selectively converted into a character string object.

Appendix 12

Appendix 12 relates to specific examples of the change of the stroke described in Appendix 1 to Appendix 11.

Appendix 12 is the handwriting input display apparatus (e.g., the handwriting input apparatus 2) according to any one of Appendix 1 to Appendix 11, wherein the change of stroke is addition, deletion, movement, deformation or division of the stroke.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The present disclosure can be implemented in any convenient form, for example using dedicated hardware, or a mixture of dedicated hardware and software. The present disclosure may be implemented as computer software implemented by one or more networked processing apparatuses. The processing apparatuses can include any suitably programmed apparatuses such as a general purpose computer, personal digital assistant, mobile telephone (such as a WAP or 3G-compliant phone) and so on. Since the present disclosure can be implemented as software, each and every aspect of the present disclosure thus encompasses computer software implementable on a programmable device. The computer software can be provided to the programmable device using any conventional carrier medium (carrier means). The carrier medium can include a transient carrier medium such as an electrical, optical, microwave, acoustic or radio frequency signal carrying the computer code. An example of such a transient medium is a TCP/IP signal carrying computer code over an IP network, such as the Internet. The carrier medium can also include a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority pursuant to 35 U.S.C. § 119(a) to Japanese Patent Application Nos. 2018-116499, filed on Jun. 19, 2018, and 2019-093665, filed on May 17, 2019, in the Japan Patent Office, the entire disclosures of which are hereby incorporated by reference herein.

REFERENCE SIGNS LIST

2 Handwriting input apparatus (an example of handwriting input display apparatus)
21 Handwriting input unit
22 Display unit
23 Handwriting input display controller (an example of display control means)
24 Candidate display timer controller
25 Handwriting input storage unit
26 Handwriting recognition controller
27 Handwriting recognition dictionary unit
28 Character string conversion controller
30 Character string conversion dictionary unit
31 Predictive conversion controller
32 Predictive conversion dictionary unit
220 Display (an example of display device)
2500 Electronic pen (an example of input means)

The invention claimed is:
1. A handwriting input display apparatus that causes a display to display a stroke generated by an input to the display as a handwritten object, the handwriting input display apparatus comprising:
display control processing circuitry for causing the display to display character string candidates including a handwriting recognition candidate, which is a result of recognizing the handwritten object as a character string, when the handwritten object does not change for a predetermined time period, wherein when the handwriting recognition candidate is selected, the display control processing circuitry causes the display to erase a display of the character string candidates and a display of the handwritten object, and causes the display to display a character string object, which is a character string indicated by the selected handwriting recognition candidate, at a position where the erased handwritten object was displayed, when selection of the handwriting recognition candidate is not performed for a predetermined time period and the display of the character string candidates is erased, the display control processing circuitry causes the handwritten object to be kept displayed to allow a user to continue handwriting input, and when a next stroke is to be added to the handwritten object, and when a handwritten object vicinity rectangular area and a stroke rectangular area overlap each other, the handwritten object vicinity rectangular area being a rectangular area obtained by enlarging a handwritten object rectangular area as a minimum rectangular area including the stroke indicated by the handwritten object by a predetermined distance in a vertical direction and a horizontal direction, the stroke rectangular area being a minimum rectangular area including an additional stroke, which is a stroke that is different from the handwritten object, the display control processing circuitry causes the display to display the handwritten object to which the additional stroke has been added.

2. The handwriting input display apparatus of claim 1, wherein the display control processing circuitry causes the display to display the character string candidates including a recognition conversion candidate, which is another character string converted from the handwriting recognition candidate, when the recognition conversion candidate is selected, the display control processing circuitry causes the display to erase the display of the character string candidates and the display of the handwritten object, and causes the display to display a character string object, which is a character string indicated by the selected recognition conversion candidate, at a position where the erased handwritten object was displayed, and when selection of the recognition conversion candidate is not performed for a predetermined time period and the display of the character string candidates is erased, the display control processing circuitry causes the handwritten object to be kept displayed.

3. The handwriting input display apparatus of claim 1, wherein the display control processing circuitry causes the display to display the character string candidates including a recognition prediction candidate, which is predictively converted from the handwriting recognition candidate, when the recognition prediction candidate is selected, the display control processing circuitry causes the display to erase the display of the character string candidates and the display of the handwritten object, and causes the display to display a character string object, which is a character string indicated by the selected recognition prediction candidate, at a position where the erased handwritten object was displayed, and when selection of the recognition prediction candidate is not performed for a predetermined time period and the display of the character string candidates is erased, the display control processing circuitry causes the handwritten object to be kept displayed.

4. The handwriting input display apparatus of claim 3, wherein the display control processing circuitry causes the display to display the character string candidates including a conversion prediction candidate, which is predictively converted from the recognition conversion candidate, when the conversion prediction candidate is selected, the display control processing circuitry causes the display to erase the display of the character string candidates and the display of the handwritten object, and causes the display to display a character string object, which is a character string indicated by the selected conversion prediction candidate, at a position where the erased handwritten object was displayed, and when the conversion prediction candidate is not selected and the display of the character string candidates is erased, the display control processing circuitry causes the handwritten object to be kept displayed.

5. The handwriting input display apparatus of claim 1, wherein when the handwritten object vicinity rectangular area and the stroke rectangular area do not overlap each other, the display control processing circuitry causes the display to display the additional stroke as another handwritten object different from the handwritten object and to erase the display of the character string candidates.

6. The handwriting input display apparatus of claim 5, wherein the display control processing circuitry is configured to:

when the character string candidates are displayed, change a display of the handwritten object rectangular area and display the changed display of the handwritten object rectangular area; and when the display of the character string candidates is erased, cancel the change of the display of the handwritten object rectangular area.

7. The handwriting input display apparatus of claim 5, wherein the display control processing circuitry is configured to:

when a difference between a time when the stroke indicated by the handwritten object is first added and a time when the stroke is last added is equal to or longer than a predetermined time period, and when a difference between a horizontal distance as a distance in a horizontal direction of the handwritten object rectangular area and a vertical distance as a distance in a vertical direction of the handwritten object rectangular area is equal to or longer than a predetermined distance, identify the vertical distance as a predicted character size, when the horizontal distance is longer than the vertical distance;

identify the horizontal distance as the predicted character size, when the horizontal distance is shorter than the vertical distance;

select a specific predefined font size from among predefined font sizes indicating a plurality of types of font sizes based on the predicted character size; and cause the display to display the character string object in the specific predefined font size of a predefined font style, which is a font style defined in advance.

8. The handwriting input display apparatus of claim 5, wherein the display control processing circuitry is configured to:

when the difference between a time when the stroke indicated by the handwritten object is first added and a time when the stroke is last added is equal to or longer than a predetermined time period, and when a horizontal distance as a distance in the horizontal direction of the handwritten object rectangular area is longer than a vertical distance as a distance in the vertical direction with respect to the vertical distance, determine that a predicted writing direction is a horizontal writing direction;

when the horizontal distance is shorter than the vertical distance, determine that the predicted writing direction is a vertical writing direction;

when the predicted writing direction is the horizontal writing direction, cause the display to display the character string candidates above or below the handwritten object rectangular area; and when the predicted writing direction is the vertical writing direction, cause the display to display the character string candidates to a left or right of the handwritten object rectangular area.

9. The handwriting input display apparatus of claim 8, wherein the display control processing circuitry is configured to:

when the character string candidates are displayed above the handwritten object rectangular area, cause the display to display the character string candidates from bottom to top in a selection probability descending order, which is a descending order of probability with which each of the character string candidates is selected;

when the character string candidates are displayed below the handwritten object rectangular area, cause the display to display the character string candidates from top to bottom in the selection probability descending order;

when the character string candidates are displayed to a right of the handwritten object rectangular area, cause the display to display the character string candidates from left to right in the selection probability descending order; and when the character string candidates are displayed to the left of the handwritten object rectangular area, cause the display to display the character string candidates from right to left in the selection probability descending order.

10. The handwriting input display apparatus of claim 8, wherein the display control processing circuitry is configured to:

when the character string candidates are displayed above or below the handwritten object rectangular area, cause the display to display the character string candidates in horizontal writing; and when the character string candidates are displayed to the right or left of the handwritten object rectangular area, cause the display to display the character string candidates in vertical writing.

11. The handwriting input display apparatus of claim 1, wherein when the handwritten object is selected and an addition of the stroke to the selected handwritten object or one of a deletion, movement, deformation and division of the stroke in the handwritten object occurs, the display control processing circuitry causes the display to display the character string candidates.

12. The handwriting input display apparatus of claim 1, wherein the change of the handwritten object is an addition of the stroke to the handwritten object, or one of a deletion, movement, deformation and division of the stroke in the handwritten object.

13. A handwriting input display method comprising:

using a display, displaying, as a handwritten object, a stroke generated based on input coordinates, which represent a contact position where an inputter is in contact with a handwriting surface, during a time period from an inputter down state in which the inputter is detected as being in touch with the handwriting surface to an inputter up state in which the inputter is detected as being apart from the handwriting surface;

using the display, displaying character string candidates including a handwriting recognition candidate, which is a result of recognizing the handwritten object as a character string, when the handwritten object does not change for a predetermined time period;

when the handwriting recognition candidate is selected, using the display, erasing a display of the character string candidates and a display of the handwritten object;

using the display, displaying a character string object, which is a character string indicated by the selected handwriting recognition candidate, at a position where the erased handwritten object was displayed; and when selection of the handwriting recognition candidate is not performed for a predetermined time period and the display of the character string candidates is erased, causing the handwritten object to be kept displayed to allow a user to continue handwriting input, and when a next stroke is to be added to the handwritten object, and when a handwritten object vicinity rectangular area and a stroke rectangular area overlap each other, the handwritten object vicinity rectangular area being a rectangular area obtained by enlarging a handwritten object rectangular area as a minimum rectangular area including the stroke indicated by the handwritten object by a predetermined distance in a vertical direction and a horizontal direction, the stroke rectangular area being a minimum rectangular area including an additional stroke, which is a stroke that is different from the handwritten object, causing the display to display the handwritten object to which the additional stroke has been added.

14. A non-transitory computer readable recording medium storing a program that causes a computer to execute the method of claim 13.

15. A handwriting input display apparatus that causes display to display a stroke generated by an input to the display, the handwriting input display apparatus comprising:

display control processing circuitry for causing the display to display character string candidates including a handwriting recognition candidate, which is a result of recognizing the stroke as a character string, when the stroke does not change for a predetermined time period, wherein when the handwriting recognition candidate is selected, the display control processing circuitry causes the display to erase a display of the character string candidates and a display of the stroke, and causes the display to display a character string object, which is a character string indicated by the selected handwriting recognition candidate, at a position where the erased stroke was displayed, when selection of the handwriting recognition candidate is not performed for a predetermined time period and the display of the character string candidates is erased, the display control processing circuitry causes the stroke to be kept displayed to allow a user to continue handwriting input, and when a next stroke is to be added to the handwritten object, and when a handwritten object vicinity rectangular area and a stroke rectangular area overlap each other, the handwritten object vicinity rectangular area being a rectangular area obtained by enlarging a handwritten object rectangular area as a minimum rectangular area including the stroke indicated by the handwritten object by a predetermined distance in a vertical direction and a horizontal direction, the stroke rectangular area being a minimum rectangular area including an additional stroke, which is a stroke that is different from the handwritten object, causing the display to display the handwritten object to which the additional stroke has been added.

16. The handwriting input display apparatus of claim 15, wherein the display control processing circuitry causes the display to display the character string candidates including a recognition conversion candidate, which is another character string converted from the handwriting recognition candidate, when the recognition conversion candidate is selected, the display control processing circuitry causes the display to erase the display of the character string candidates and the display of the stroke, and causes the display to display a character string object, which is a character string indicated by the selected recognition conversion candidate, at a position where the erased stroke was displayed, and when selection of the recognition conversion candidate is not performed for a predetermined time period and the display of the character string candidates is erased, the display control processing circuitry causes the stroke to be kept displayed.

17. The handwriting input display apparatus of claim 15, wherein the display control processing circuitry causes the display to display the character string candidates including a recognition prediction candidate, which is predictively converted from the handwriting recognition candidate, when the recognition prediction candidate is selected, the display control processing circuitry causes the display to erase the display of the character string candidates and the display of the stroke, and causes the display to display a character string object, which is a character string indicated by the selected recognition prediction candidate, at a position where the erased stroke was displayed, and when selection of the recognition prediction candidate is not performed for a predetermined time period and the display of the character string candidates is erased, the display control processing circuitry causes the stroke to be kept displayed.

18. The handwriting input display apparatus of claim 17, wherein the display control processing circuitry causes the display to display the character string candidates including a conversion prediction candidate, which is predictively converted from the recognition conversion candidate, when the conversion prediction candidate is selected, the display control processing circuitry causes the display to erase the display of the character string candidates and the display of the stroke, and causes the display to display a character string object, which is a character string indicated by the selected conversion prediction candidate, at a position where the erased stroke was displayed, and when the conversion prediction candidate is not selected and the display of the character string candidates is erased, the display control processing circuitry causes the stroke to be kept displayed.

\* \* \* \* \*